United States Patent
Xie et al.

(10) Patent No.: US 12,216,709 B1
(45) Date of Patent: Feb. 4, 2025

(54) COMPUTER-IMPLEMENTED METHODS FOR MACHINE LEARNING MODEL BASED SPATIAL-TEMPORAL ADAPTIVE SHIFT FOR END-TO-END TEXT-VIDEO RETRIEVAL

(71) Applicant: Amazon Technologies, Inc., Seattle, WA (US)

(72) Inventors: Ning Xie, Bellevue, WA (US); Han Li, Seattle, WA (US); Qipin Chen, Bellevue, WA (US); Yuan Chen, San Francisco, CA (US); Lingyun Wang, Bothell, WA (US)

(73) Assignee: Amazon Technologies, Inc., Seattle, WA (US)

( * ) Notice: Subject to any disclaimer, the term of this patent is extended or adjusted under 35 U.S.C. 154(b) by 133 days.

(21) Appl. No.: 18/188,420

(22) Filed: Mar. 22, 2023
(51) Int. Cl.
  *G06F 16/78* (2019.01)
  *G06F 16/783* (2019.01)
  (Continued)
(52) U.S. Cl.
  CPC ........ *G06F 16/7867* (2019.01); *G06F 16/783* (2019.01); *G06T 1/0021* (2013.01); *G06V 10/70* (2022.01); *H04N 21/232* (2013.01)
(58) Field of Classification Search
  CPC ... G06F 16/7867; G06F 16/783; G06V 10/70; G06T 1/0021; H04N 21/232
  See application file for complete search history.

(56) References Cited

U.S. PATENT DOCUMENTS

| 8,792,732 | B1* | 7/2014 | Zhao | G06V 10/761 |
| | | | | 382/190 |
| 2023/0154159 | A1* | 5/2023 | Kim | G06V 10/82 |
| | | | | 382/159 |
| 2024/0037948 | A1* | 2/2024 | Chen | G06F 16/732 |

OTHER PUBLICATIONS

Bain, M., et al., "Frozen in Time: A Joint Video and Image Encoder for End-to-End Retrieval", Proceedings of the IEEE/CVF International Conference on Computer Vision (ICCV), Oct. 2021, pp. 1728-1738.
(Continued)

Primary Examiner — Nnenna N Ekpo
(74) Attorney, Agent, or Firm — NICHOLSON DE VOS WEBSTER & ELLIOTT LLP

(57) ABSTRACT

Techniques for performing a machine learning model based spatial-temporal adaptive shift for end-to-end text-video retrieval are described. According to some examples, a computer-implemented method includes receiving a video comprising a plurality of frames at a content delivery service; generating, by the content delivery service, a set of embeddings for each of a plurality of sections of each frame of the plurality of frames; determining, by a candidate selector machine learning model of the content delivery service, a proper subset of the plurality of sections of each frame of the plurality of frames for a time shift based on the set of embeddings; time shifting, by the content delivery service, the proper subset of the plurality of sections of each frame of the plurality of frames to generate time shifted frames; generating, by the content delivery service, an updated set of embeddings based on the time shifted frames; receiving a search request comprising input text from a user
(Continued)

device; determining the video is a match for the search request based on the input text and the updated set of embeddings for the time shifted frames; and sending the video to the user device based on the match.

20 Claims, 12 Drawing Sheets
(4 of 12 Drawing Sheet(s) Filed in Color)

(51) Int. Cl.
    *G06T 1/00*       (2006.01)
    *G06V 10/70*     (2022.01)
    *H04N 21/232*   (2011.01)

(56) References Cited

OTHER PUBLICATIONS

Cheng, X., et al., "Improving Video-Text Retrieval by Multi-Stream Corpus Alignment and Dual Softmax Loss", arXiv:2109.04290v3, Nov. 22, 2021, 11 pages.

Dzabraev, M., et al., "MDMMT: Multidomain Multimodal Transformer for Video Retrieval", Proceedings of the IEEE/CVF Conference on Computer Vision and Pattern Recognition (CVPR) Workshops, Jun. 2021, 10 pages.

Fang, H., et al., "CLIP2Video: Mastering Video-Text Retrieval via Image CLIP", arXiv:2106.11097v1, Jun. 21, 2021, 10 pages.

Gao, Z., et al., "CLIP2TV: An Empirical Study on Transformer-based Methods for Video-Text Retrieval", arXiv:2111.05610v1, Nov. 10, 2021, 5 pages.

Liu, Y., et al., "TS2-Net: Token Shift and Selection Transformer for Text-Video Retrieval", Lecture Notes in Computer Science, vol. 13674, Oct. 23, 2022, pp. 1-17.

Luo, H., et al., "CLIP4Clip: An Empirical Study of CLIP for End to End Video Clip Retrieval", arXiv:2104.08860v2, May 8, 2021, 14 pages.

Radford, A., et al., "Learning Transferable Visual Models From Natural Language Supervision", Proceedings of the 38th International Conference on Machine Learning, PMLR, vol. 139, Jul. 2021, 16 pages.

Shazeer, N., et al., "Outrageously Large Neural Networks: The Sparsely-Gated Mixture-of-Experts Layer", arXiv:1701.06538v1, Apr. 2017, pp. 1-19.

* cited by examiner

COMPUTER-IMPLEMENTED METHODS FOR MACHINE LEARNING MODEL BASED SPATIAL-TEMPORAL ADAPTIVE SHIFT FOR END-TO-END TEXT-VIDEO RETRIEVAL

BACKGROUND

Generally described, computing devices utilize a communication network, or a series of communication networks, to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, data centers or data processing centers, herein generally referred to as "data centers," may include a number of interconnected computing systems to provide computing resources to users of the data center. The data centers may be private data centers operated on behalf of an organization or public data centers operated on behalf, or for the benefit of, the general public. Service providers or content creators (such as businesses, artists, media distribution services, etc.) can employ one or more data centers to deliver content (such as web sites, web content, or other digital data) to users or clients.

BRIEF DESCRIPTION OF DRAWINGS

The patent or application file contains at least one drawing executed in color. Copies of this patent or patent application publication with color drawing(s) will be provided by the Office upon request and payment of the necessary fee.

Various examples in accordance with the present disclosure will be described with reference to the following drawings.

DETAILED DESCRIPTION

Figure 1:
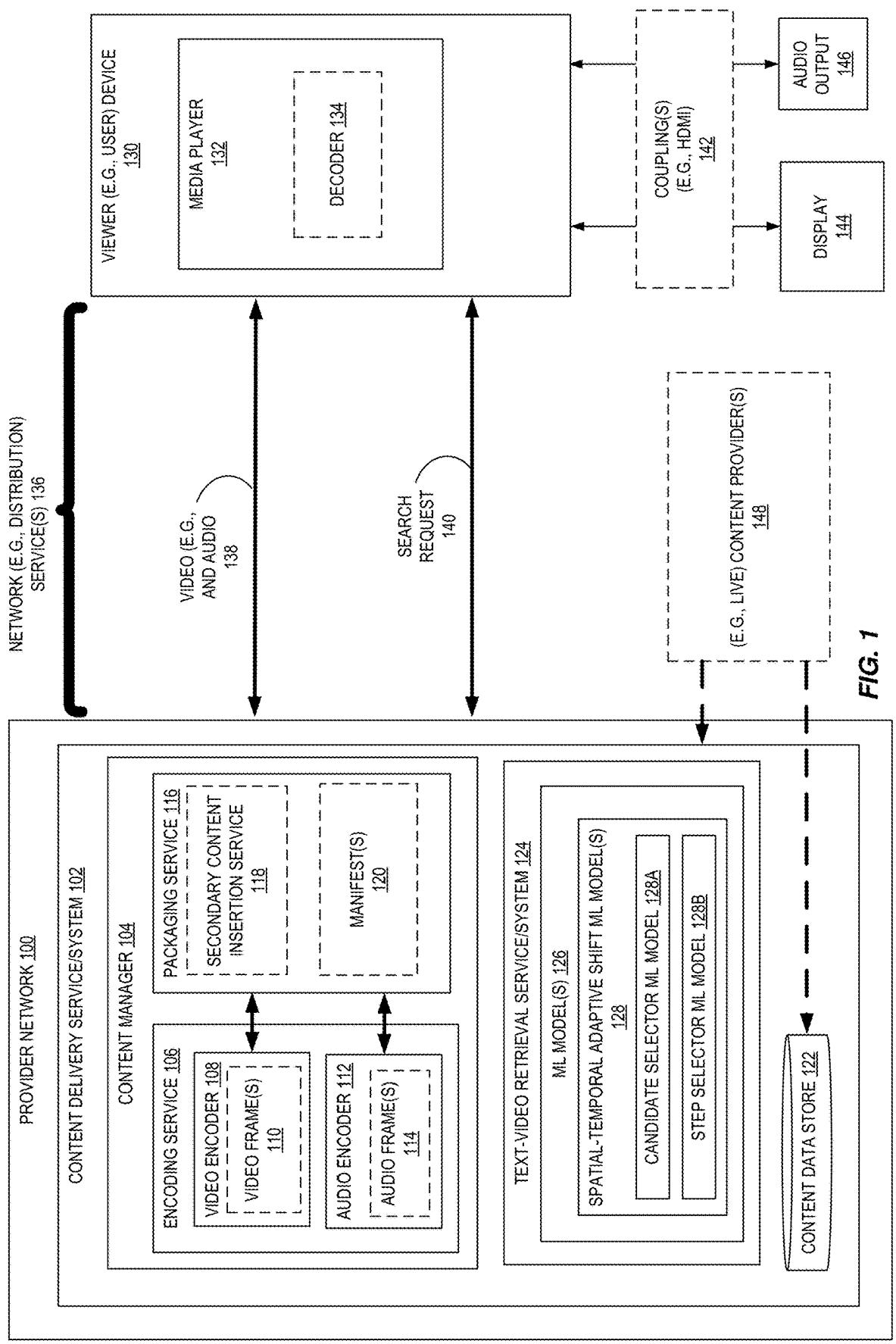
FIG. 1 is a diagram illustrating an environment including a provider network, including a text-video retrieval service/system that includes one or more spatial-temporal adaptive shift machine learning (ML) models, coupled to a viewer (e.g., user) device according to some examples.

The present disclosure relates to methods, apparatus, systems, and non-transitory computer-readable storage media for performing a machine learning model based spatial-temporal adaptive shift for end-to-end text-video retrieval. Certain examples herein are directed to implementing a candidate selector machine learning (ML) model that determines a proper subset of a plurality of sections (e.g., "patches") of each frame of a plurality of frames of a video. Additionally, or alternatively, certain examples herein are directed to implementing a (e.g., time) step selector machine learning (ML) model that determines a shift step for time shifting a proper subset of a plurality of sections (e.g., "patches") of each frame of a plurality of frames of a video, e.g., the proper subset of the plurality of sections (e.g., "patches") determined by the candidate selector ML model.

Text-video retrieval is the task of retrieving the most relevant videos (or text descriptions) given a text (or video) query. With the increasing number of videos available (e.g., uploaded to the internet), text-video retrieval plays an important role with many real-world applications. Extracting high quality video representations which summarize features from both spatial (for example, in a space, e.g., within a single frame of a video) and temporal (for example, across time, e.g., across a plurality of frames) perspectives is one key to the success of text-video retrieval. Certain examples utilize a temporal-based section (e.g., patch) shift scheme to capture subtle cross-frame spatial-temporal interactions. However, a parameter-free shift nature neglects the semantic context of different videos, leading to sub-optimal shift performance. Examples herein are directed to a machine learning (ML) based adaptive shift (AdaShift) solution (e.g., computer-implemented method), e.g., which dynamically adjusts shift granularities regarding the spatial and temporal dimensions under different visual context. In certain examples, an adaptive shift ML model(s) includes a candidate selector ML model (e.g., that determines a proper subset of a plurality of sections (e.g., "patches") of each frame of a plurality of frames of a video) and/or a (e.g., time) step selector machine learning (ML) model (e.g., that determines a shift step for time shifting a proper subset of a plurality of sections (e.g., "patches") of each frame of a plurality of frames of a video). In certain examples, to train an adaptive shift ML model(s) effectively, a mixture-of-experts (MoE) machine learning technique is used for key shift component implementation, e.g., further enhanced with text-video dropout for better model generalization.

Certain advances in large-scale language-image pre-training tremendously benefits text-video retrieval. Specifically, certain examples utilize cross-modal contrastive learning to embed images and image captions jointly using (e.g., millions of) image-caption pairs, so that the similarity of images and captions can be compared in a shared embedding space. Certain methods generally formulate the task in an "encoding-then-comparing" paradigm, where deep-learning based text and video encoders are utilized to first transform the raw text and video content into embeddings respectively in a shared semantic space, followed by a similarity matcher to calculate the text-video similarity using pre-defined metrics such as, but not limited to, the cosine similarity.

Considering the nature of a video which consists of a sequence of temporal-dependent frames, developing an effective video (feature) encoder (e.g., in contrast to a video codec) to capture features from both spatial and temporal perspectives is one key to the success of text-video retrieval tasks. Certain examples implement a video encoder relying on a Transformer ML model to first extract per-frame features, then perform frame-level shallow aggregation to generate video embeddings, hence lacking the ability to capture the fine-grained spatial-temporal details between adjacent frames. To mitigate the gap, certain shift-based approaches enhance the capability of capturing subtle spatial-temporal frame interactions with shift operations.

Specifically, certain examples adopt a temporal shift scheme by splitting frames into sections (e.g., patches) then conducting a section-level (e.g., patch-level) shift along the temporal dimension on selected sections (e.g., patches). However, a major limitation of these examples is that they perform shift operations in a parameter-free manner, for example, by selecting a constant number of sections (e.g., patches) (e.g., 25% of all sections (e.g., patches)) for a fixed temporal step shift (for example, one time step, e.g., one frame) for all videos. This neglects the semantic context of different videos and the desired shift operation granularity, which leads to sub-optimal shift performance.

To address the limitation, the examples herein utilize one or more adaptive shift ML models, e.g., as a novel learning-based spatial-temporal shift model(s) for end-to-end text-video retrieval. In certain examples, the one or more adaptive shift ML models performs an adaptive shift empowered by two neural network based learnable components, e.g., (i) the shift candidate selector and (ii) the shift step selector, to determine which section (e.g., patches) to shift and for how many temporal steps. With this, examples herein can dynamically adjust shift granularities regarding the spatial and temporal dimensions under different visual context to capture finer inter-frame local movements, yielding better video representation quality.

In certain examples, developing one or more adaptive shift ML models raises technical challenges (e.g., technical problems). First, in certain examples there is no explicit supervision on the optimal section (e.g., patch) shift candidate and step configuration per video, and thus the one or more adaptive shift ML models is to automatically learn based on different video context in the text-video contrastive training procedure in certain instances. However, in certain examples, the discrete nature of shift candidate and step selection creates discontinuity in the learning space and causes difficulty in model training. Certain examples herein provide a technical solution to these technical challenges (e.g., technical problems) by implementing one or more adaptive shift ML models (e.g., (i) the (shift) candidate selector ML model and/or (ii) the (shift) step selector ML model), e.g., using an MoE routing. Specifically, to perform shift in a bounded and controllable way, certain examples herein first pre-define shift configurations where section (e.g., patch) shift candidates and steps will be generated from. In certain examples, each adaptive shift ML model (e.g., (i) the (shift) candidate selector ML model and/or (ii) the (shift) step selector ML model) consists of a set of experts (e.g., expert ML models), with an expert (e.g., ML model) mapping to a specific configuration (e.g., the number of shift steps) and generating a confidence score. Thus, the model training can be naturally guided by directly optimizing the confidence scores of the experts (e.g., expert ML models). Second, in certain examples, adding learnable components introduces more training parameters, which reduces model generalizability in an end-to-end training with limited data. To alleviate this issue, certain examples herein adopt dropout in text-video similarity matching in the training phase to enhance model generalization. Certain examples herein are directed to using a learnable, adaptive shift to improve text-video retrieval, e.g., implemented by one or more adaptive shift ML models using mixture-of-experts combined with text-video dropout to ensure effective model training.

Text-video retrieval has been a long-lasting challenge due to its complexities from cross-modal feature fusion as well as understanding the temporal context in videos. Certain approaches take advantage of language-image pre-training of an ML model and transfer the knowledge to end-to-end text-video retrieval with text-video contrastive learning. To further enhance capturing fine-grained spatial-temporal frame interactions, certain shift-based approaches are used, for example, performing section (e.g., patch) level shift operations along the temporal dimension. However, in certain examples the shift operations are conducted in a static parameter-free manner, neglecting the semantic context of different videos. Certain examples herein do not neglecting the semantic context of different videos, e.g., via using a learnable, adaptive spatial-temporal shift to further improve text-video retrieval.

Certain video representation learning convolutional neural network (CNN) based models for video representation, e.g., using an attention mechanism for video representation and/or a channel-based shift to capture information along the temporal axis for video summarization. Different from those, certain examples herein utilize a learnable section (e.g., patch) level shift to keep the information integrity in cross-frame interaction.

In certain examples, a mixture-of-experts (MoE) is a machine learning framework where multiple experts (e.g., models) are used to divide the problem space into homogeneous regions. Unlike certain ensemble techniques, certain MoEs activate a single or a few experts to produce the final result for a given input, e.g., which allows efficient inference while drastically increasing the model capacity. Certain models utilize a MoE to generate multi-perspective video representations for text-video retrieval. Different from those, certain examples herein leverage MoEs for an adaptive shift configuration selection.

FIG. 1 is a diagram illustrating an environment including a provider network 100, including a text-video retrieval service/system 124 that includes one or more spatial-temporal adaptive shift machine learning (ML) models 126, coupled to a viewer (e.g., user) device 130 according to some examples.

In certain examples, the provider network 100 (e.g., cloud provider) is coupled to the viewer (e.g., user) device 130 via network (e.g., distribution) service(s) 136. In certain examples, viewer (e.g., user) device 130 is to play one or more video (e.g., and audio) feeds 138, for example, in response to a search request 140 from the viewer (e.g., user) device 130. In certain examples, the search request 140 is input text (e.g., a string of words) (for example, text entered by viewer/user into device 130, e.g., via a keyboard), or a value (e.g., embedding) based on the input text. In certain examples, the search request is a query to find a video including certain features.

In certain examples, the text-video retrieval service/system 124 determines a match (e.g., from content data store 122) for the search request, e.g., and causes the provider network 100 (e.g., content manager 104) to send the matching video (e.g., and audio) 138 (or an indication, e.g., clickable link) for the matching video) to the viewer (e.g., user) device 130. Although certain examples herein are directed to inputting a textual search request and returning a video (e.g., indication of the video) for the (e.g., closest) match to that text, it should be understood that the examples herein (e.g., the spatial-temporal adaptive shift ML models disclosed herein) may be utilized for an input of a video and returning a textual string (e.g., description) for the (e.g., closest) match to that video.

In certain examples, the text-video retrieval service/system 124 includes one or more ML models 126, or example, one or more spatial-temporal adaptive shift ML models 128 as disclosed herein. In certain examples, the one or more (e.g., spatial-temporal) adaptive shift ML models 128 includes (i) a (shift) candidate selector ML model 128A and/or (ii) a (shift) step selector ML model 128B. Examples of (i) the (shift) candidate selector ML model 128A and (ii) the (shift) step selector ML model 128B are discussed below.

In certain examples, viewer (e.g., user) device 130 includes a media player 132 to play the video (e.g., and audio) 138. In certain examples, the media player 132 includes a decoder 134 to decode the video for viewing on display 144 and/or audio for outputting on audio output (e.g., speaker) 146. In certain examples, media player device 130 includes a coupling 142 (e.g., according to a standard, such as, but not limited to, a High-Definition Multimedia Interface (HDMI) standard) to display 144 and/or audio output 146. In certain examples, the display 144 and/or audio output 146 (e.g., speaker(s)) are separate from the media player device 130, e.g., a stick media player device. In certain examples, the display 144 and/or audio output 146 (e.g., speaker(s)) are part of the media player device 130, e.g., a smart television device.

In certain examples, media player 132 includes a media player device user identification (ID), e.g., to uniquely identify the user of that media player 132 (e.g., or device 130). In certain examples, a media player 132 allows each user of a plurality of users to have their own media player device user identification (ID).

In certain examples, viewer (e.g., user) device 130 (e.g., media player 132) includes a corresponding graphical user interface (GUI) that is displayed on display 144, e.g., to allow a user to enter a search request 140 and/or to allow a user to select the suggested matching content for viewing.

In certain examples, a content provider 148 is to send content to a content data store 122 (e.g., which may be implemented in one or more data centers) and/or content manager 104 (e.g., a single content manager or multiple content managers). In certain examples, a content provider 148 is on site to capture video (e.g., and audio) of a live event. In certain examples, content provider 148 is to encode the resulting output and send that encoded content to one or more downstream entities (e.g., content delivery service/system 102, e.g., via one or more networks.

As one example, a media file (e.g., including a video file and audio file) (e.g., a media container) that is to be encoded is accessed from the content data store 122 by content manager 104. In certain examples, the media file may be uploaded to content data store 122 by content provider(s) 148 or provided directly (e.g., as live content) to content manager 104 by content provider(s) 148 (e.g., from a live content encoder).

In certain examples, the content manager 104 (which may include one or more of the components discussed herein) controls the encoding (e.g., transcoding) of a media file into packages and files in various formats and in different sizes for distribution to end users (e.g., viewers). In certain examples, a user (e.g., separate from an end user or client) creates a job for a (e.g., uncompressed) multimedia file by specifying (e.g., via a console of or an application programming interface (API) call to the content manager) the information that the service will use to perform the encoding (e.g., transcoding) which may include, which multimedia file(s) to encode (e.g., transcode), which types of files to create and where to store them, which encoding settings to use, which advanced features to apply, etc. In certain examples, to set up a job, a user specifies the input files (e.g., from content data store 122) for the service to encode (e.g., transcode from one format to a different format), for example, by specifying the source for each video, audio, and/or captions media element. That source might be a specific part of a primary input file, or it might be a separate file. In certain examples, to set up a job, a user specifies the types of output files (e.g., and packages) that are to be generated from the input. In certain examples, to set up a job, a user specifies the encoding settings to produce the quality and type of output that is desired.

In certain examples, the encoding service 106 is to encode the media file (e.g., video file and corresponding audio file) into one or more sets of video and audio representations (e.g., streams). In FIG. 1, video encoder 108 is to receive an input of a video file and create video frame(s) 110 from that video file, e.g., for a video frame and/or fragment duration. In FIG. 1, audio encoder 112 is to receive an input of an audio file and create audio frame(s) 114 (e.g., a number of audio samples within each frame) for that audio file, e.g., at an audio frame and/or fragment duration. In certain examples, packaging service 116 is then to create one or more sets of multimedia (e.g., video and audio) representations (e.g., a media presentation), for example, a representation according to a standard (e.g., a MPEG-DASH standard, a HyperText Transfer Protocol (HTTP) Live Streaming (HLS) standard, a Smooth Streaming standard, or other standard). Encoding service 106 may include a plurality of instances of video encoder 108 and audio encoder 112, e.g., to process multiple inputs in parallel. In certain examples, secondary content insertion service 118 adds secondary content (e.g., advertisement(s)) into a main content. In certain examples, encoding service 106 is to encode both the main content and secondary content, e.g., and the secondary content insertion service 118 is to insert the secondary content into the main content.

In certain embodiments, packaging service 116 includes one or more manifests 120, e.g., identifying the media file(s) (e.g., fragments, streams, etc.). In certain embodiments, a manifest for a particular media file (e.g., a particular title) identifies a proper subset of video and audio representations of the media file for a particular viewer device 130 (e.g., based on the client's media player (e.g., determined from its client ID value), display 144 resolution, audio output 146 capabilities, and/or available bandwidth). In certain embodiments, the content is stored in the content delivery service/system 102 in two parts: (i) the manifest 120 of all available media representations (e.g., their URL addresses and, optionally, other characteristics) and (ii) the media files (e.g., representations) (e.g., stream of fragments) in a single (e.g., container) or multiple files (e.g., in content data store 122). In certain embodiments, a viewer device 130 is to read a manifest 120 (e.g., sent in response to manifest request) before the client device may make a request for the media from that manifest, and thus access media files (e.g., video fragments and/or corresponding audio fragments) from content data store 122.

Figure 2:
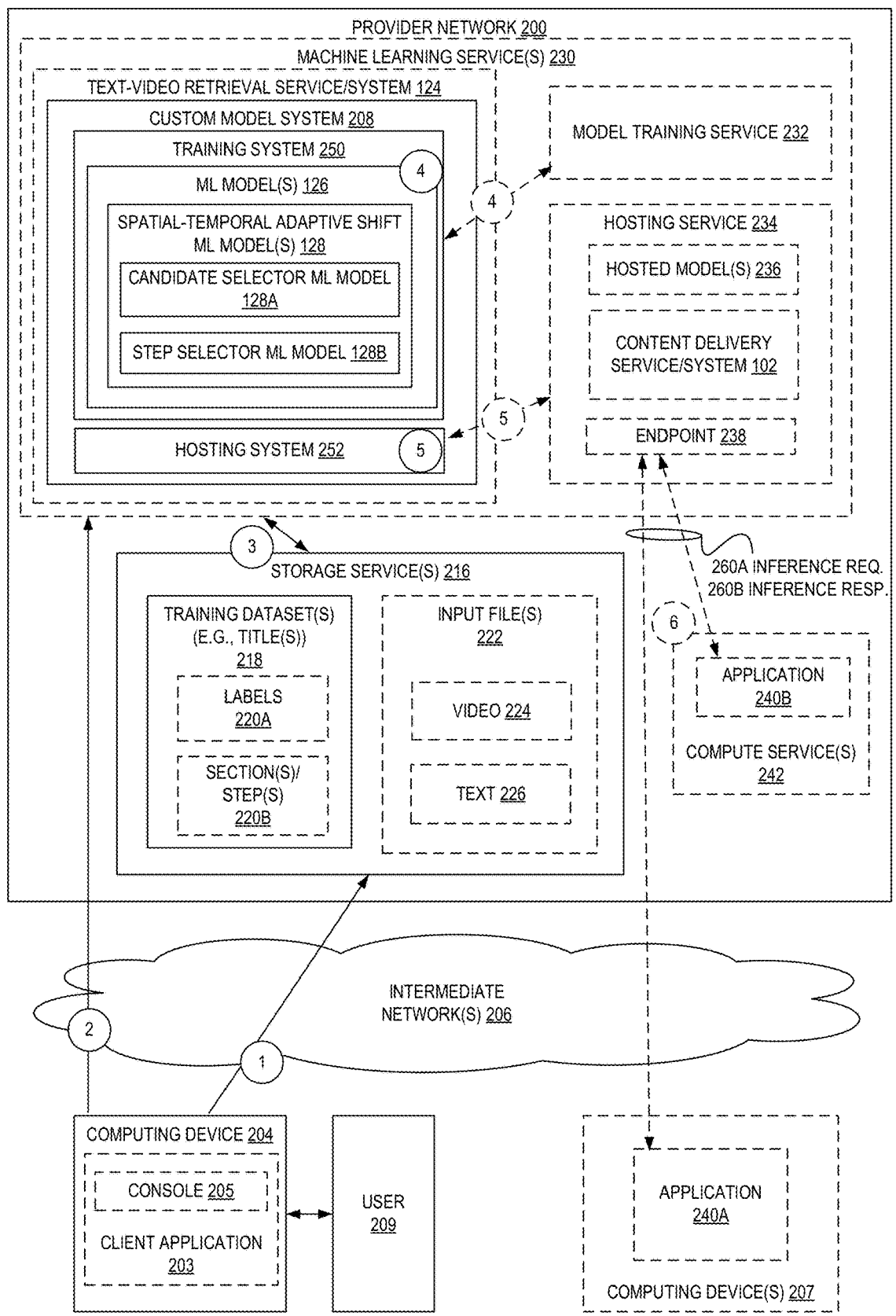
FIG. 2 is a diagram illustrating an environment for creating, training, and using one or more machine learning models according to some examples.

FIG. 2 is a diagram illustrating an environment for creating, training, and using one or more machine learning models 126 according to some examples. FIG. 2 includes a text-video retrieval service/system 124, one or more content delivery service/system 102, one or more storage services 216, one or more machine learning services 230, and one or more compute services 242 implemented within a multi-tenant provider network 200. Each of the a text-video retrieval service/system 124, one or more content delivery service/system 102, one or more storage services 216, one or more machine learning services 230, one or more model training services 232, one or more hosting services 234, and one or more compute services 242 may be implemented via software, hardware, or a combination of both, and may be implemented in a distributed manner using multiple different computing devices.

A provider network 200 (or, "cloud" provider network) provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances or a serverless code execution service that executes code (either of which may be referred to herein as a compute service 242), a storage service 216 that can store data objects, etc. The users (or "customers") of provider networks 200 may utilize one or more user accounts that are associated with a customer account, though these terms may be used somewhat interchangeably depending upon the context of use. Users may interact with a provider network 200 across one or more intermediate networks 206 (e.g., the internet) via one or more interface(s), such as through use of application programming interface (API) calls, via a console 205 implemented as a website or application, etc. The interface(s) may be part of, or serve as a front-end to, a control plane of the provider network 200 that includes "backend" services supporting and enabling the services that may be more directly offered to customers.

For example, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

Generally, the traffic and operations of a provider network may broadly be subdivided into two categories: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes customer resources that are implemented on the provider network (e.g., computing instances, containers, block storage volumes, databases, file storage). Data plane traffic generally includes non-administrative operations such as transferring customer data to and from the customer resources. The control plane components are typically implemented on a separate set of servers from the data plane servers, and control plane traffic and data plane traffic may be sent over separate/distinct networks.

To provide these and other computing resource services, provider networks 200 often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance (e.g., provided by a hardware virtualization service) hosted by the provider network to perform a variety of computing tasks. Additionally, or alternatively, a user may indirectly utilize a compute instance by submitting code to be executed by the provider network (e.g., via an on-demand code execution service), which in turn utilizes a compute instance to execute the code—typically without the user having any control of or knowledge of the underlying compute instance(s) involved.

For example, in various examples, a "serverless" function may include code provided by a user or other entity—such as the provider network itself—that can be executed on demand. Serverless functions may be maintained within provider network 200 by an on-demand code execution service (which may be one of compute service(s) 242) and may be associated with a particular user or account or be generally accessible to multiple users/accounts. A serverless function may be associated with a Uniform Resource Locator (URL), Uniform Resource Identifier (URI), or other reference, which may be used to invoke the serverless function. A serverless function may be executed by a compute instance, such as a virtual machine, container, etc., when triggered or invoked. In some examples, a serverless function can be invoked through an application programming interface (API) call or a specially formatted HyperText Transport Protocol (HTTP) request message. Accordingly, users can define serverless functions (e.g., as an application 240B) that can be executed on demand, without requiring the user to maintain dedicated infrastructure to execute the serverless function. Instead, the serverless functions can be executed on demand using resources maintained by the provider network 200. In some examples, these resources may be maintained in a "ready" state (e.g., having a preinitialized runtime environment configured to execute the serverless functions), allowing the serverless functions to be executed in near real-time.

The text-video retrieval service/system 124, in some examples, is a machine learning powered service that allows for an end-to-end text-video retrieval, e.g., the best matching video(s) for an input text string.

The training system 250, for example, may enable users to generate one or more machine learning models 126 (for example, one or more (e.g., spatial-temporal) adaptive shift ML models 128, e.g., (i) a (shift) candidate selector ML model 128A and/or (ii) a (shift) step selector ML model 128B). In certain examples, the ML model(s) 126 (e.g., adaptive shift ML models 128) outputs a result that indicates a matching video (e.g., from content data store 122 in FIG. 1) for an inputted textual string 226 (or a matching textual string (e.g., out of a plurality of candidate textual strings (e.g., descriptions) for an inputted video 222).

Figure 4:
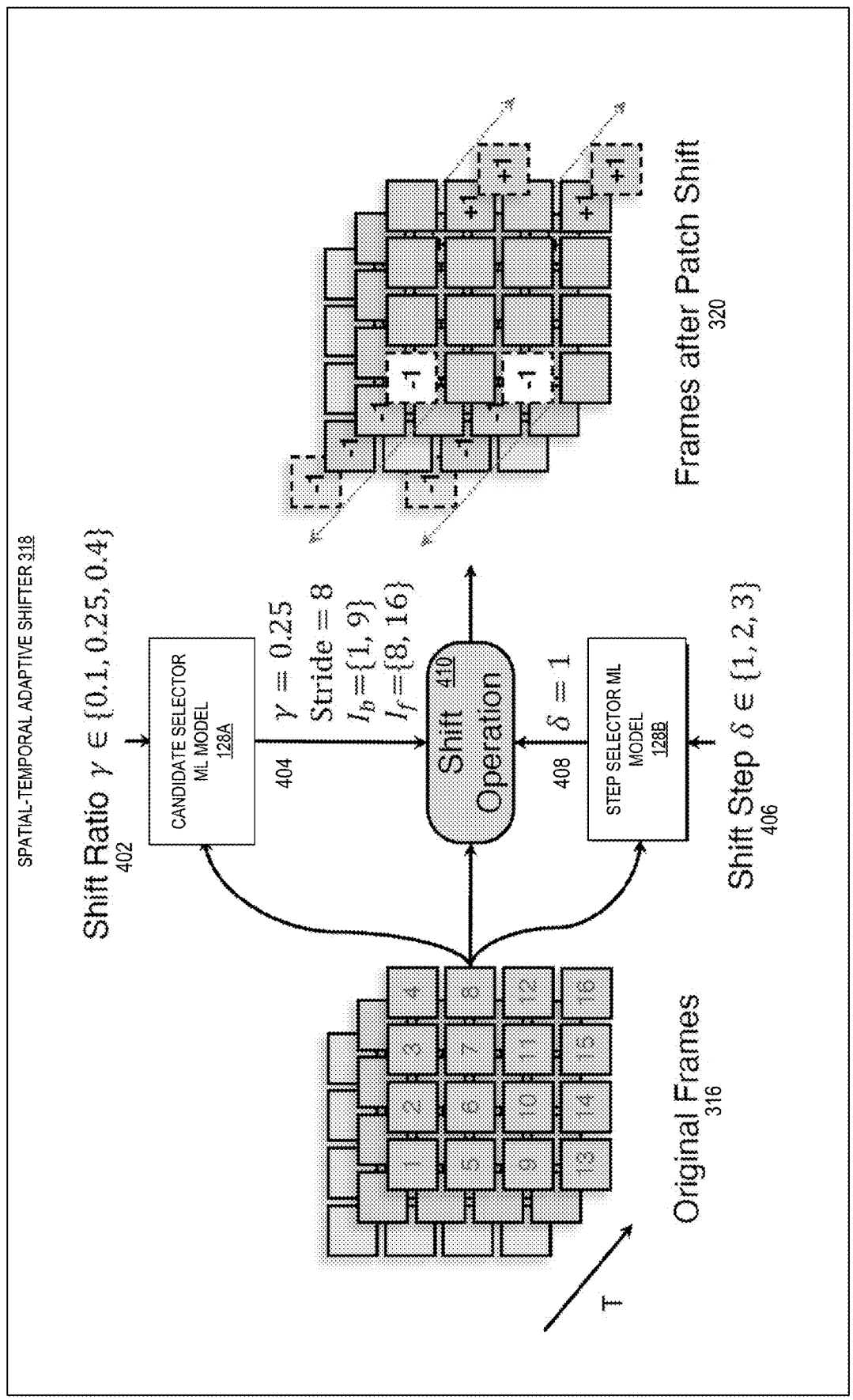
FIG. 4 is a diagram illustrating an adaptive shift workflow for a spatial-temporal adaptive shifter according to some examples.

In certain examples, the training system 250 enables users to generate a (shift) candidate selector ML model 128A that outputs (e.g., for an input of one of more frames of a video) an indication of which sections (e.g., patches) of one or more frames of an input video 224 are to be shifted, e.g., in certain examples this includes one or more of the categories of values 404 shown in FIG. 4 (e.g., a (shift) ratio of shifted to unshifted sections of a frame). In certain examples, the training system 250 enables users to generate a (shift) step selector ML model 128B that outputs (e.g., for an input of one of more frames of a video) an indication of a shift step (e.g., number of frames to shift) for one or more sections (e.g., patches) of one or more frames of an input video 224, e.g., the shift step 408 shown in FIG. 4.

Examples herein allow a customer to create one or more (e.g., spatial-temporal) adaptive shift ML models 128 by supplying a training dataset 218 (for example, including labels 220A (e.g., textual strings) and/or sections (e.g., patches) and/or (time shift) steps 220B used for training).

In some examples, the text-video retrieval service/system 124—via use of a custom model system 208—allows users to build and use one or more (e.g., spatial-temporal) adaptive shift ML models 128.

At a high level, machine learning may include two major components that are required to be put in place in order to expose advertised functionality to the customer: (i) training and (ii) inference. Training may include the following responsibilities: training data analysis; data split (training, evaluating (e.g., development or validation), and/or testing data); model selection; model training; model evaluation; and status reporting. Inference may include the following responsibilities: model loading and hosting; and inference (e.g., synchronous and batch).

Training may include training a candidate algorithm into model(s), e.g., into one or more (e.g., spatial-temporal) adaptive shift ML models 128, and respective configurations (e.g., coefficients and/or hyperparameters). Training may perform a grid search over the matrix of experiments (e.g., defined upfront) in search for the model and its parameters (e.g., hyperparameters) that performs best on the given dataset.

Thus, a user 209 may provide or otherwise identify training data 218 (e.g., with labels 220A and/or indication of sections (e.g., patches) and/or (time shift) steps 220B) for use in creating a custom model. For example, as shown at circle (1), the user 209 may utilize a client application 203 executed by a computing device 204 (e.g., a web-application implementing a console 205 for the provider network 200, a standalone application, another web-application of another entity that utilizes the text-video retrieval service/system 124 as a part of its backend, a database or mixed-SQL environment, etc.) to cause the computing device 204 to upload the data 218 to a storage location (e.g., provided by a storage service 216 such as an object storage service of a provider network 200).

The data 218 may be a columnar dataset that includes rows (or entries) of data values, where the data values may be arranged according to one or more columns (or attributes) and may be of a same datatype (e.g., one storing text). In some cases, the data 218 includes headings or other metadata describing names or datatypes of the columns, though in some cases this metadata may not exist. For example, some or all of the data 218 may have been provided by a user as a plaintext file (e.g., a comma-separated values (CSV) or tab-separated values (TSV) file), an exported database table or structure, an application-specific file such as a spreadsheet, etc.

For example, when a user 209 desires to train a model 126, this file (or files) may include labels corresponding to the file (e.g., video, audio, and/or text), e.g., with a label indicating category (ies) of content in the file.

Thereafter, at circle (2) the computing device 204 may issue one or more requests (e.g., API calls) to the machine learning service 230 that indicate the user's 209 desire to train one or more algorithms into model(s), e.g., into one or more adaptive shift ML models 128. The request may be of a type that identifies which type of model(s) are to be created or identifies that the machine learning service 230 itself is to identify the candidate model(s), e.g., candidate adaptive shift ML model 128. The request may also include one or more of an identifier of a storage location or locations storing the data 218 (e.g., an identifier of the labels 220A and/or sections (e.g., patches) and/or (time shift) steps 220B), which may identify a storage location (e.g., via a Uniform Resource Locator (URL), a bucket/folder identifier, etc.) within the provider network 200 (e.g., as offered by a storage service 216) or external to the provider network 200, a format identifier of the data 218, a language identifier of the language of the labels 220A, etc. In some examples, the request includes an identifier (e.g., from the user 209) of the candidate algorithm(s) themselves within the request.

Responsive to receipt of the request, the custom model system 208 of the machine learning service 230 is invoked and begins operations for training the corresponding type of model. For example, the custom model system 208 may identify what type of model is to be trained (e.g., via analyzing the method call associated with the request), the storage location(s) associated with the data 218 (e.g., labels 220A and/or sections (e.g., patches) and/or (time shift) steps 220B), etc. Thus, the custom model system 208 may retrieve any stored data 218 elements as shown at circle (3), which may be from a storage location within the provider network 200 or external to the provider network 200.

In some examples, the training (at dotted circle (4)) of model(s) 126, includes performing (at optional, dotted circle (4)) by training service 232 of machine learning service 230 a particular training job (e.g., hyperparameter optimization tuning job), or the like.

In some examples, the hosting system 252 (at circle (5)) of the custom model system 208 may make use (at optional, dotted circle (5)) of a hosting service 234 of a machine learning service 230 to deploy a model as a hosted model 236 in association with an endpoint 238 that can receive inference requests from client applications 240A and/or 240B at circle (8), provide the inference requests 260A to the associated hosted model(s) 236, and provide inference results 260B (e.g., a prediction, including, but not limited to, a shift ratio and/or a shift step) back to applications 240A and/or 240B, which may be executed by one or more computing devices 207 outside of the provider network 200 or by one or more computing devices of a compute service 242 (e.g., hardware virtualization service, serverless code execution service, etc.) within the provider network 200. Inference results 260B may be displayed to a user and/or viewer (e.g., in a graphical user interface of the application) and/or exported as a data structure (e.g., in a selected format). In certain examples, the inference results are utilized by content delivery service/system 102 to return an indication of a matching video (e.g., the video itself) for a textual input 226 based at least in part on the inference results (e.g., inferred shift ratio and/or inferred shift step).

Figure 3:
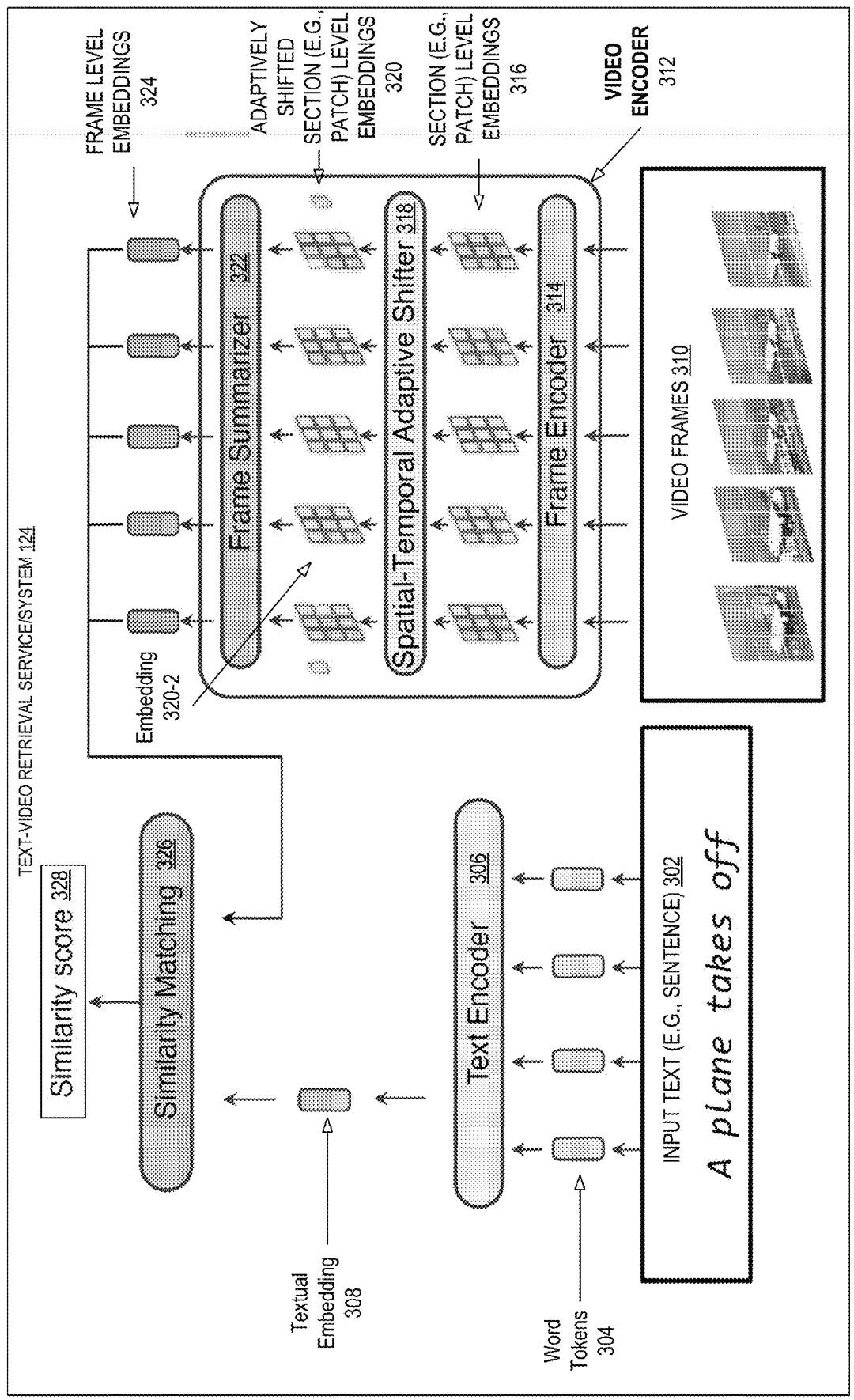
FIG. 3 is a diagram illustrating an example architecture for a text-video retrieval service/system that includes a spatial-temporal adaptive shifter according to some examples.

FIG. 3 is a diagram illustrating an example architecture for a text-video retrieval service/system 124 that includes a spatial-temporal adaptive shifter 318 according to some examples. In certain examples, the spatial-temporal adaptive shifter 318 includes (i) a (shift) candidate selector ML model 128A and/or (ii) a (shift) step selector ML model 128B.

In certain examples, text-video retrieval service/system 124 receives as an input text (e.g., sentence) 302 (e.g., as a query to find a video that is pertinent for that input text) and finds a closest match (e.g., via similarity score 328) by comparing that input text 302 to one of more frames 310 for a video (e.g., for each set of corresponding frames for a plurality of candidate videos) (e.g., from content data store 122 in FIG. 1).

In certain examples, given a set of natural language input text (e.g., sentences) T (e.g., input text 302) and a set of video clips V (e.g., video frames 310), certain text-video retrieval services/systems 124 (e.g., that include one or more adaptive shift ML models 128) aim to learn a similarity function $s(t_i, v_j)$ measuring the cross-modal similarity between a textual input (e.g., sentence of "t") $t_i \in T$ and a video (e.g., clip "v") $v_j \in V$, such that similarity score $s(t_i, v_j)$ generates a higher score when $t_i$ and $v_j$ are semantically relevant to each other (e.g., $t_i$ is the caption for $v_j$, e.g., it is a summary of the video $v_j$), while yielding a lower score when irrelevant. The depicted text-video retrieval service/system 124 includes a text encoder 306, video encoder 312, and a text-video similarity matcher 326 (e.g., matching service). Although each of the video frames 310 are depicted as being divided into nine sections (e.g., nine patches) any other granularity (e.g., plurality of sections) may be utilized. Although five input video frames 310 are depicted, it should also be understood that other granularities may be utilized.

Text Encoder

Given a sentence $t_i = \{w_1, w_2, \ldots, w_{|t_i|}\}$ which is a sequence of $|t_i|$ word tokens 304 (e.g., as a sequence of integers) for the input text 302, in certain examples the text encoder 306 (e.g., learns to) summarize the semantic information of the tokens and generates a textual embedding $q_i$ 308 (e.g., embedding vector). In certain examples, the text encoder 306 is a (e.g., Transformer-based) ML model, e.g., with 12 self-attention layers and 8 attention heads. In certain examples, the input text 302 (e.g., sentence) $t_i$ is padded with [BOS] at the beginning of the token sequence and [EOS] end of the token sequence before feeding into the text encoder 306. In certain examples, the output of [EOS] of the text encoder's final layer is treated as the representation $q_i$ for sentence $t_i$. In certain examples, the textual embedding 308 generated by the text encoder 306 for an input of text 302 is used by similarity matching 326 service to determine a match between the textual embedding 308 (e.g., embedding vector) and a video (e.g., that includes video frames 310) of a plurality of candidate videos. In certain examples, the output of the similarity matching 326 service is a similarity score (e.g., from 0 to 1, where 1 indicates a best match and 0 is a least match) for the input text 302 (e.g., its textual embedding 308) and one or more videos (e.g., their frame level embeddings 324). In certain examples, video encoder 312 is to output the frame level embeddings 324.

Video Encoder

In certain examples, the video encoder 312 generates a set of frame level embeddings 324 (e.g., on a per frame granularity) for an input of video frames 310.

In certain examples, given a video clip $v_j$, the text-video retrieval service/system 124 (e.g., video encoder 312) (e.g., randomly) samples a sequence of temporal-sorted image frames to represent $v_j = \{f1, f2, \ldots, f|v_j|\}$. In certain examples, two vertical lines around a vector indicate the number of elements in a vector, e.g., $|v_j|$ is the number of elements (and thus $f|v_j|$ is the last frame) in the video clip $v_j$. In certain examples, the video encoder 312 generates a sequence of frame embeddings 324 (e.g., embedding vectors) $Fj = \{f_1, f_2, \ldots, f_{|v_j|}\}$ correspondingly, where each $f_k \in F_j$ summarizes the key visual information of the frame $f_k \in v_j$. In certain examples, the video encoder 312 consists of three components: frame encoder 314, spatial-temporal adaptive shifter 318, and frame summarizer 322.

In certain examples, the frame encoder 314 generates section-level (e.g., patch-level) embeddings 316. In FIG. 3, the set of section-level (e.g., patch-level) embeddings 316 for each frame is shown as the same color, for example, sections (e.g., patches) 1-9 for the first frame are shown as peach, sections (e.g., patches) 1-9 for the second frame are shown as gray, sections (e.g., patches) 1-9 for the third frame are shown as yellow, sections (e.g., patches) 1-9 for the fourth frame are shown as green, and sections (e.g., patches) 1-9 for the fifth frame are shown as purple. In certain examples, the section-level (e.g., patch-level) embeddings 316 are input into spatial-temporal adaptive shifter 318 (e.g., that includes (i) a (shift) candidate selector ML model 128A and (ii) a (shift) step selector ML model 128B) that generates respective sets of adaptively shifted section (e.g., patch) level embeddings 320. In FIG. 3, the time shift (e.g., to or from a different (e.g., forward or backward) other frame to an other frame) is shown with the varying colors. For example, in FIG. 3, the set of embeddings 320-2 of the second frame (shown as entirely gray in embeddings 316 before any adaptive shifting) are modified so that the embeddings 320-2 now include one embedding from the previous (in video order) frame (shown as a peach section (e.g., patch) in embeddings 320-2) and one embedding from the following (in video order) frame (shown as a yellow section (e.g., patch) in embeddings 320-2). In certain examples, an embedding (e.g., embedding vector) is a lower dimensional value (e.g., space) generated (e.g., translated) from a higher dimensional value (e.g., space). In certain examples, an embedding is a dense numerical representation of real-world objects and relationships, e.g., expressed as a vector. In certain examples, an embedding (e.g., embedding vector) indicates at least some of the characteristics of an input by placing (e.g., visually and/or semantically) similar inputs close together in the embedding space. An embedding can be learned and reused across ML models. Image embeddings can indicate gradient magnitudes, colors, grayscale intensities, edges, areas, etc. Text embeddings can share the same embedding space with image embeddings, e.g., for a text-video search (e.g., similarity).

In certain examples, each of the respective sets of adaptively shifted section (e.g., patch) level embeddings 320 are then input into a frame summarizer 322, e.g., that generates a corresponding frame level embedding 324 for each set of adaptively shifted section (e.g., patch) level embeddings 320 (e.g., with the number of frame level embeddings 324 matching the number of respective sets of adaptively shifted section (e.g., patch) level embeddings 320 and/or the number of input frames; e.g., shown as five).

In certain examples, the frame level embeddings 324 are used by similarity matching 326 service to determine a match (e.g., similarity score 328) between the textual embedding 308 (e.g., embedding vector) and a video (e.g., that includes video frames 310) of a plurality of candidate videos.

In certain examples, for each frame of a video clip (e.g., $f_k \in v_j$), the frame encoder 314 generate patch-level embeddings 316. In certain examples, a (e.g., pre-trained Visual Transformer (ViT)) is used as the frame encoder 314. In certain examples, given a frame $f_k$, the video encoder 312 first splits each frame $f_k$ into a (e.g., flattened) sequence of n patches, e.g., padded with a class [CLS] token, $E_k=\{p_{cls}^k, p_1^k, p_2^k, \ldots, p_n^k\}$. In certain examples, $E_k$ is then input into the frame encoder 314 (e.g., ML model) (e.g., ViT) to generate the patch embeddings $E_k=\{p_{cls}^k, p_1^k, p_2^k, \ldots, p_n^k\}$.

In certain examples, the learning-based spatial-temporal adaptive shifter 318 (e.g., shift module) takes the patch embedding sequences $E_1, E_2, \ldots, E_{|v_j|}$ from the (e.g., all) input frames 310 as input, and shifts the (embeddings of) selected patches along the temporal dimension of frames, with the goal of exchanging information of adjacent frames to capture the local movement context.

FIG. 4 is a diagram illustrating an adaptive shift workflow for a spatial-temporal adaptive shifter 318 according to some examples. In FIG. 4, each frame is depicted as being divided into sixteen sections (e.g., patches) 316, for example, with a corresponding sixteen different embeddings (shown as 1-16) 316 with the time increasing show as arrow with a "T". In certain examples, these set of section (e.g., patch) level embeddings 316 are input into the candidate selector ML model 128A, the step selector ML model 128B, and/or the shift operation 410.

In FIG. 4, the depicted example shows the candidate selector ML model 128A has inferred a shift ratio 404 of 0.25 (e.g., to shift one fourth of the sections (e.g., patches) in a frame) and the step selector ML model 128B has inferred a shift step 408 of one (e.g., one frame forward and/or one frame backward). In FIG. 4, the depicted example further shows the spatial-temporal adaptive shifter 318 has determined, at 404: a stride (shown as 8), a set of backward shift candidate indices ($I_b$) for each section (e.g., patch) (shown as {1,9}), and a set of forward shift candidate indices ($I_f$) for each section (e.g., patch) (shown as {8,16}).

Using the green set of embeddings (e.g., for a single frame), in certain examples, the embedding for the section (e.g., patch) at index 1 of the "green" frame is replaced (via the shift operation 410) with the section (e.g., patch) at index 1 of the white frame (shown as white "−1"), the embedding for the section (e.g., patch) at index 9 of the "green" frame is replaced (via the shift operation 410) with the section (e.g., patch) at index 9 of the white frame (shown as white "−1"), the embedding for the section (e.g., patch) at index 8 of the "green" frame is replaced (via the shift operation 410) with the section (e.g., patch) at index 8 of the blue frame (shown as blue "+1"), and the embedding for the section (e.g., patch) at index 16 of the "green" frame is replaced (via the shift operation 410) with the section (e.g., patch) at index 16 of the blue frame (shown as blue "+1"). Thus with 16 embeddings and a shift ratio of 0.25, 16*0.25=4, and thus the green frame (e.g., and the other frames) have four of their embeddings replaced with the embeddings from other frames.

In certain examples, assuming the step selector ML model 128B has inferred a shift step 408 of one (e.g., one frame forward and/or one frame backward), on section (e.g., patch) position 1 for frames in $v_j$, then the spatial-temporal adaptive shifter 318 generates an updated patch embeddings sequence 320, for example, $\hat{E}_k=\{\hat{p}_{cls}^k, \hat{p}_1^k, \hat{p}_k^2, \ldots, \hat{p}_n^k\}$ for each frame of the video (e.g., $f_k \in v_j$) when $k<|v_j|$. Thus, examples herein enable adaptive shift in a learnable way by dynamically selecting the shift candidates (e.g., which patches to shift) and steps to control the shift granularity, and hence (e.g., better) captures cross-frame interaction and context.

In certain examples, given the updated (adaptively shifted) patch embedding sequences 320, e.g., $\hat{E}_1, \hat{E}_2, \ldots, \hat{E}_{|v_j|}$, from the spatial-temporal adaptive shifter 318, the frame summarizer 322 then extracts key features from $\hat{E}_k$ to generate the frame embedding $f_k$ (cumulatively frame level embeddings 324) for each frame $f_k$. In certain examples, the frame summarizer 322 is a patch selection transformer ML model. The frame level embeddings 324 can then be used by similarity matching 326.

Text-Video Similarity Matcher

In certain examples, the similarity matcher 326 uses the text embedding 308 ($q_i$) of $t_i$ and the frame level embeddings 324, e.g., frame embedding sequence $F_j=\{f_1, f_2, \ldots, f_{|v_j|}\}$ of $v_j$ as the inputs, to generate the similarity score $s(t_i,v_j)$ indicating their semantic relevance. In certain examples, a two-step, attention-based approach is used to generate the similarity. In certain examples, the text-frame similarity score of each text (e.g., caption) "t" and frame "f", e.g., $(t_i,f_k)$, pair as follows:

$$\sigma(t_i, f_k) = \frac{q_i \cdot I_k}{\|q_i\| \cdot \|f_k\|} \tag{1}$$

In certain examples, the final similarity score 328 is computed as a weighted sum of the text-frame scores, e.g.:

$$s(t_i, v_j) = \sum_{f_k \in v_j} \lambda_k \sigma(t_i, f_k) \tag{2}$$

where the weight $\lambda_k$ for each text-frame score is:

$$\lambda_k = \frac{\exp(\alpha \cdot \sigma(t_i, f_k))}{\sum_{f' \in v_j} \exp(\alpha \cdot \sigma(t_i, f'))} \tag{3}$$

and $\alpha$ (e.g., =4) is the temperature hyperparameter.

Spatial-Temporal Adaptive Shifter

Below is a further discussion of example details of a spatial-temporal adaptive shifter 318 according to examples of the disclosure. In certain examples, the spatial-temporal adaptive shifter 318 performs a section (e.g., patch) shift over the temporal dimension, e.g., instead of a patch shift in a parameter-free approach. For examples, certain examples herein do not constantly select the same shift ratio and/or same shift step regardless of different context, hence examples herein are more capable of capturing subtle movements in local temporal intervals. Certain examples herein utilize ML models (e.g., neural networks (NNs)) to learn to adaptively select patch candidates (e.g., shift ratios) and temporal (e.g., shift) steps for shifting under different visual context.

In certain examples, spatial-temporal adaptive shifter 318 includes (i) a (shift) candidate selector ML model 128A and (ii) a (shift) step selector ML model 128B.

Shift Candidate Selector

Figure 5:
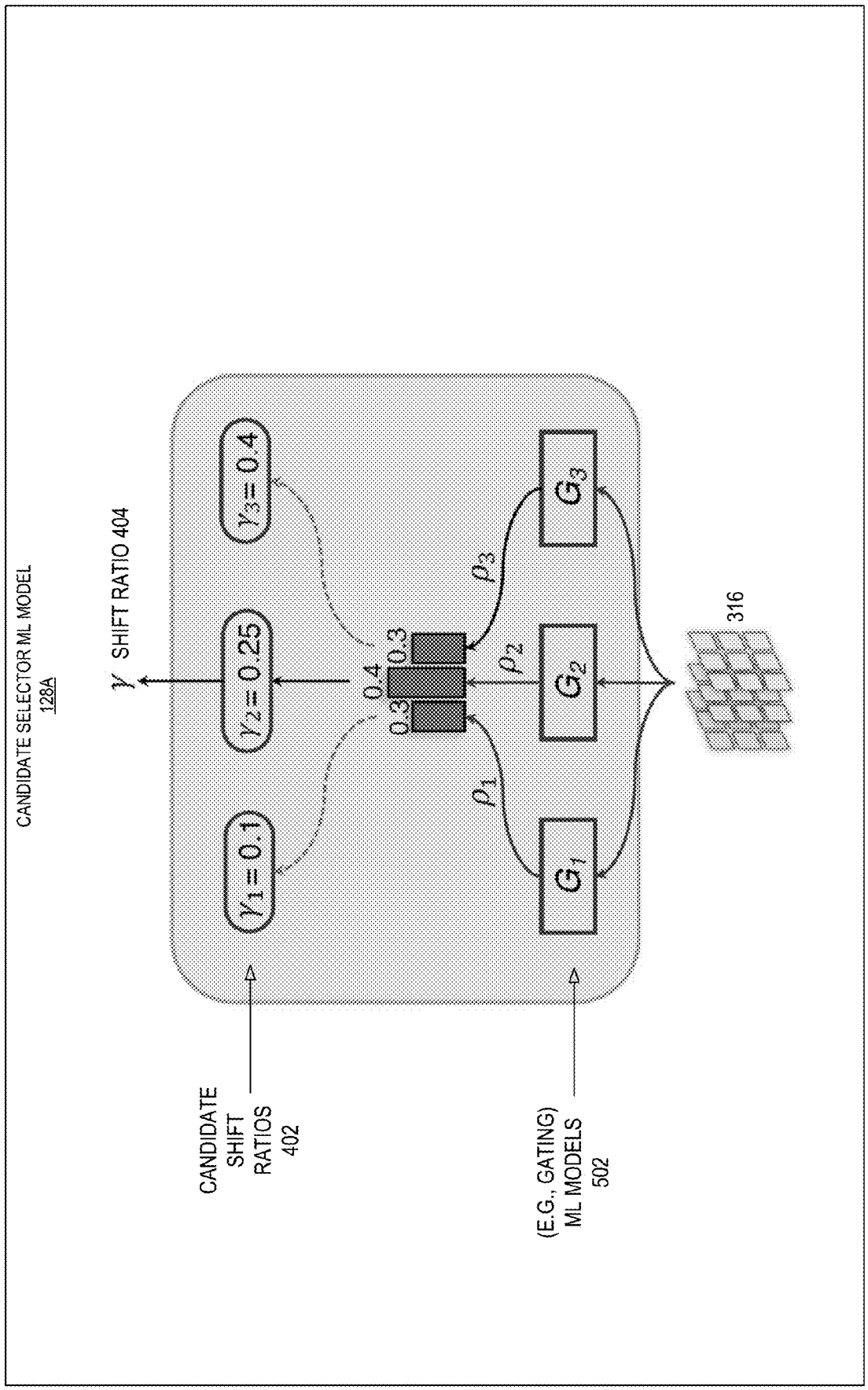
FIG. 5 is a diagram illustrating a shift candidate (e.g., shift ratio) selector workflow for a candidate selector ML model according to some examples.

FIG. 5 is a diagram illustrating a shift candidate (e.g., shift ratio) selector workflow for a candidate selector ML model 128A according to some examples.

In certain examples, given section (e.g., patch) level embedding sequences 316, e.g., $\{E_k\}_{k=1}^{|v_j|}$, from the frame encoder 314 where each sequence $E_k = \{p_{cls}^k, p_1^k, p_2^k, \ldots, p_n^k\}$, the shift candidate selector ML model 128A learns to generate (e.g., two) sets of non-overlapping patch position indices:

$I_b$ (for backward in video order)
$I_f$ (for foreword in video order)

(both in [1, n]) that will be targeted for backward and forward section (e.g., patch) shift respectively along the temporal dimension, e.g., where the class [CLS] embedding is the summary of the entire frame, and hence it is not considered as a shift candidate.

In certain examples, candidate selector ML model 128A is a (e.g., NN-based) ML ratio selection model that generates a shift ratio γ indicating γ proportion of all patch positions (e.g., within one frame or all frames being input into the spatial-temporal adaptive shifter 318) will be shifted.

In certain examples, without explicit supervision, the discrete nature of patch selection creates discontinuity in the learning space, causing difficulty in model training. To perform shift in a controllable manner and make the model training tractable, certain examples implement the model in a routing-like mixture-of-experts (MoE) approach. In certain examples, instead of allowing an arbitrary γ which can potentially damage the frame integrity, a ratio set 402, e.g., $\{\gamma_i\}_{i=1}^m$ of m values is pre-determined (by not by candidate selector ML model 128A) and the candidate selector ML model 128A infers ratio γ 404 from them. In certain examples, a set of (e.g., gating) ML models 502 (e.g., as a set of "gating" or "routing" experts $\{G_i\}_{i=1}^m$) are created, where each Gi is a "routing path" to $\gamma_i$ and generates a score $\rho_i$ indicating the confidence that $\gamma = \gamma_i$. In certain examples, a (e.g., gating) ML model 502 (e.g., expert Gi) take as input $\{E_k\}_{k=1}^{|v_j|}$, e.g., to use a multi-layer perceptron (MLP) with Layer-Norm and Gaussian Error Linear Unit (GELU) activation function to generate the score $\rho_i$, e.g., as follows:

$$\rho_i = \frac{1}{|v_j|} \sum_{k=1}^{|v_j|} \frac{1}{|E_k|} \sum_{p^k \in E_k} MLP_i(p^k) \quad (4)$$

In certain examples, let $i^* = \arg\max \{\rho_i\}_{i=1}^m$ be the index of the (e.g., gating) ML model 502 (e.g., expert Gi) that generates the largest score. In certain examples, $|v_j|$ is the number of elements (e.g., frames) in in the video clip $v_j$.

In certain examples, the final (e.g., "best") shift ratio γ 404 is selected as $\gamma_{i^*}$.

In certain examples, candidate selector ML model 128A is trained by directly optimizing the scores of the (e.g., gating) ML models 502 (e.g., experts).

In certain examples, the inferred shift ratio γ 404 is used to generate shift candidate index set and $I_b$ and $I_f$, e.g., by uniformly selecting patch positions from [1, n] with a fixed stride. In certain examples, to capture both backward and forward frame context, the shift ratio γ 404 is split equally by performing a γ/2 backward and forward section (e.g., patch) shift. In certain examples, the shift stride (e.g., number of frames offset from the current frame) (e.g., both backward and forward) is determined as 2/γ. In certain examples, within each stride window, the first and last patch for backward and forward shift are determined, respectively.

In certain examples, shift candidate index set $I_b$ and $I_f$ are generated as:

$$I_b = \left\{ 1 + \left\lceil \frac{2}{\gamma} \right\rceil * i \,\middle|\, i \leq \frac{n-1}{\lceil 2/\gamma \rceil} \right\} \quad (5)$$

$$I_f = \left\{ \left\lceil \frac{2}{\gamma} \right\rceil * (i+1) \,\middle|\, i \leq \frac{n}{\lceil 2/\gamma \rceil} - 1 \right\}$$

Thus, referring again to FIG. 4, an example video clip includes three frames (shown color coded as yellow, blue, and green), each frame has sixteen sections (e.g., patches), the candidate shift ratio set 402 is {0.1, 0.25, 0.4} and assume the shift ratio 404 γ is selected as 0.25 (e.g., from a score of 0.4 being higher than either 0.3) (e.g., after feeding the patch embeddings 316 from all frames to the candidate selector ML model 128A), the shift stride is, 2/γ, i.e., 2/0.25=8. In certain examples, based on a stride of 8, the spatial-temporal adaptive shifter 318 splits the (e.g., all) position indices into two windows [1, ..., 8] and [9, ..., 16], and within each window, the first and last index is chosen for backward and forward shift, respectively, based on (5) above. Hence $I_b = \{1, 9\}$ and $I_f = \{8, 16\}$ as shown in FIG. 4.

Shift Step Selector

Figure 6:
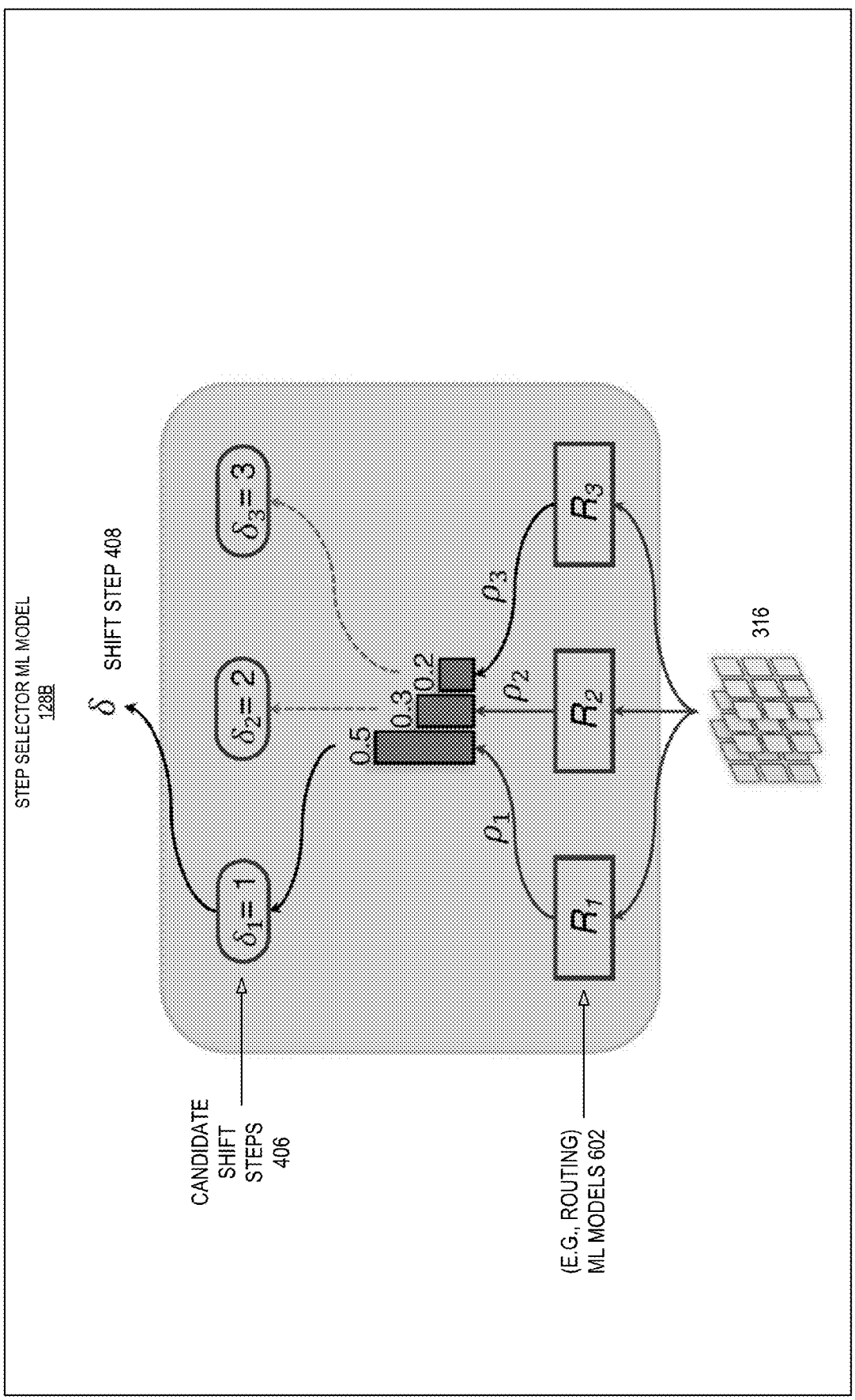
FIG. 6 is a diagram illustrating a shift step selector workflow for a step selector ML model according to some examples.

FIG. 6 is a diagram illustrating a shift step selector workflow for a step selector ML model 128B according to some examples.

In certain examples, the step selector ML model 128B uses (e.g., all) patch embedding sequences 316, e.g., $\{E_k\}_{k=1}^{|v_j|}$, as the input to generate the number of temporal shift steps for the selected shift candidates $I_b$ and $I_f$.

In certain examples (e.g., similarly to the candidate selector ML model 128A), the step selector ML model 128B is implemented as an MoE. In certain examples, instead of allowing an arbitrary shift step δ, a shift step set 406, e.g., $\{\delta_i\}_{i=1}^l$ of l values (e.g., integers) is pre-determined (by not by step selector ML model 128B) and the step selector ML model 128B infers shift step δ 408 from them. In certain examples, the (e.g., NN-based) step selector ML model 128B is trained to select the final shift step δ 408 from the set 406, e.g., $\{\delta_i\}_{i=1}^l$. In certain examples, the shift step selector ML model 128B includes a set of (e.g., routing) ML models 602 (e.g., as a set of "routing" experts $\{R_i\}_{i=1}^l$ are created, with each $R_i$ mapping to shift step $\delta_i$ as a "routing path". In certain examples, an expert model 602 $R_i$ takes as input $\{E_k\}_{k=1}^{|v_j|}$ and uses an MLP to generate a confidence score in the same manner as shown in Equation (4). In certain examples, let it be the index of the expert which generates the highest score, and thus the final shift step $\delta = \delta_{i^*}$.

Certain examples herein utilize the generated shift candidate positions $I_b$ and $I_f$ as well as the shift step δ 408, to perform (e.g., via shift operation 410 in FIG. 4) a temporal-based patch shift on $\{E_k\}_{k=1}^{|v_j|}$ as follows. In certain examples, for each patch embedding $p_i^k \in E_k$:

$$p_i^k = \begin{cases} p_i^{k+\delta}, & i \in I_b \wedge (k+\delta \le |v_j|) \\ p_i^{k-\delta}, & i \in I_f \wedge k > \delta \\ p_i^k, & \text{otherwise} \end{cases} \quad (6)$$

Thus, referring again to FIG. 4, an example video clip includes three frames (shown color coded as yellow, blue, and green), each frame has sixteen sections (e.g., patches), the candidate shift step set 406 is {1, 2, 3} and shift step 408 δ is chosen as 1 after passing all patch embeddings 316 to the step selector ML model 128B. In certain examples, given shift candidates $I_b$={1, 9} and $I_f$={8, 16}, the spatial-temporal adaptive shifter 318 performs a shift step 408 (shown as one) backward shift on patches with position indices 1 and 9, and a shift step 408 (shown as one) forward shift on patches with indices 8 and 16. For example, where $p_{(patch\ index)}^{(frame\ index)}$, then replacing (e.g., the embedding for) patch $p_1^1$ (the index-1 patch in "yellow" frame 1) with (e.g., the embedding for) patch $p_1^2$ (the index-1 patch in "blue" frame 2) as a one-step backward shift, and replacing (e.g., the embedding for) $p_8^2$ (the index-8 patch in "blue" frame 2) with $p_8^1$ (the index-8 patch in "yellow" frame 1) as one-step forward shift.

Model Training
Objective Function

In certain examples, one or more (e.g., spatial-temporal) adaptive shift ML models 128 (e.g., (i) a (shift) candidate selector ML model 128A and/or (ii) a (shift) step selector ML model 128B) are trained in a contrastive learning paradigm, e.g., using the symmetric cross entropy as the objective function.

In certain examples, given a batch of N text-video pairs in a training step, the text-to-video and video-to-text contrastive loss is determined as follows:

$$\mathcal{L}_{t2v} = -\frac{1}{N} \sum_{j=1}^{N} \log \frac{\exp(\tau \cdot s(t_j, v_j))}{\sum_{k=1}^{N} \exp(\tau \cdot s(t_j, v_k))} \quad (7)$$

$$\mathcal{L}_{v2t} = -\frac{1}{N} \sum_{j=1}^{N} \log \frac{\exp(\tau \cdot s(t_j, v_j))}{\sum_{k=1}^{N} \exp(\tau \cdot s(t_k, v_j))} \quad (8)$$

where τ is a learnable temperature. In certain examples, the final loss is the mean of the results of (7) and (8):

$$\mathcal{L} = \frac{1}{2}(\mathcal{L}_{t2v} + \mathcal{L}_{v2t}) \quad (9)$$

Dropout as Implicit Data Augmentation

In certain examples, the learnable shift components introduce more training parameters, which can reduce model generalizability in end-to-end training with limited data. Certain examples herein further adopt dropout in text-video similarity matching in the training phase.

In certain examples, $q_i$ is the text embedding and $F_j$={$f_1$, $f_2$ . . . , $f_{|v_j|}$} is the frame embedding sequence. Before feeding $q_i$ and $F_j$ to similarity calculation (e.g., similarity matching 326 in FIG. 3), certain examples herein apply two different random dropout masks to $q_i$ and $F_j$ respectively to get "dropped out" $q'_i$ and $F'_j$. In certain examples, $q'_i$ and $F'_j$ are used for text-video similarity matching (e.g., Equations 1-3) and contrastive loss calculation (e.g., Equations 7-9). In contrast to using dropout for explicit positive contrast construction, certain examples herein treat it as implicit data augmentation for better model generalization in end-to-end text-video training.

Figure 7:
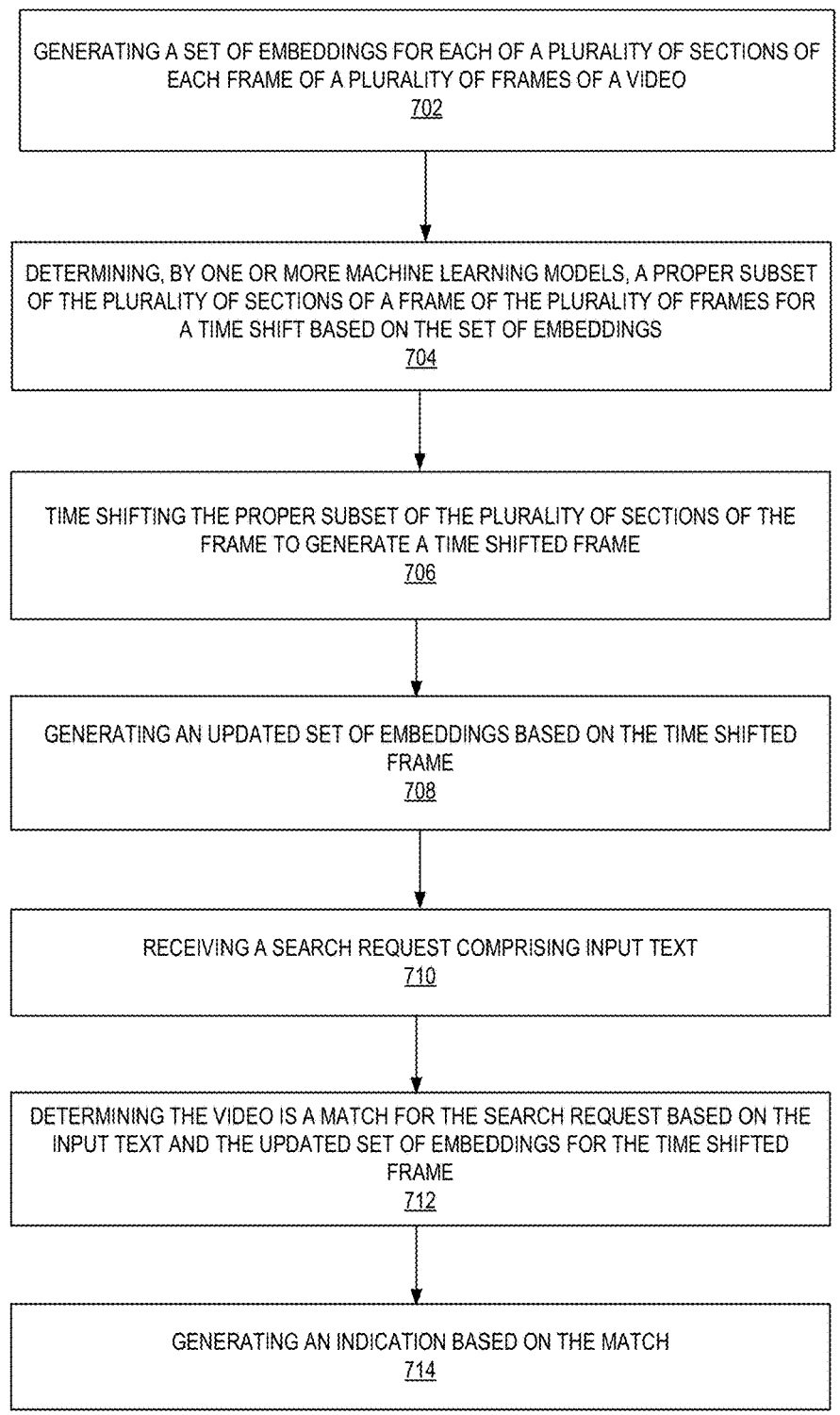
FIG. 7 is a flow diagram illustrating operations of a method of performing a text-video retrieval with a spatial-temporal adaptive shift according to some examples.

FIG. 7 is a flow diagram illustrating operations 700 of a method of performing a text-video retrieval with a spatial-temporal adaptive shift according to some examples. Some or all of the operations 700 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some examples, one or more (or all) of the operations 700 are performed by a content delivery service/system 102 (e.g., implemented in a provider network) (e.g., text-video retrieval service/system 124 thereof) of the other figures.

The operations 700 include, at block 702, generating a set of embeddings for each of a plurality of sections of each frame of a plurality of frames of a video. The operations 700 further include, at block 704, determining, by one or more machine learning models, a proper subset of the plurality of sections of a frame of the plurality of frames for a time shift based on the set of embeddings. The operations 700 further include, at block 706, time shifting the proper subset of the plurality of sections of the frame to generate a time shifted frame. The operations 700 further include, at block 708, generating an updated set of embeddings based on the time shifted frame. The operations 700 further include, at block 710, receiving a search request comprising input text. The operations 700 further include, at block 712, determining the video is a match for the search request based on the input text and the updated set of embeddings for the time shifted frame. The operations 700 further include, at block 714, generating an indication based on the match.

Exemplary environments, systems, etc. that the above may be used in are detailed below.

At least some examples of the disclosed technologies can be described in view of the following examples:

Example 1. A computer-implemented method comprising:
receiving a video comprising a plurality of frames at a content delivery service;
generating, by the content delivery service, a set of embeddings for each of a plurality of sections of each frame of the plurality of frames;
determining, by a candidate selector machine learning model of the content delivery service, a proper subset of the plurality of sections of each frame of the plurality of frames for a time shift based on the set of embeddings;
time shifting, by the content delivery service, the proper subset of the plurality of sections of each frame of the plurality of frames to generate time shifted frames;
generating, by the content delivery service, an updated set of embeddings based on the time shifted frames;
receiving a search request comprising input text from a user device;
determining the video is a match for the search request based on the input text and the updated set of embeddings for the time shifted frames; and
sending the video to the user device based on the match.

Example 2. The computer-implemented method of example 1, wherein the determining the proper subset of the plurality of sections of each frame comprises determining, by the candidate selector machine learning model of the content delivery service, a ratio of shifted to unshifted sections of the plurality of frames based on the set of embeddings.

Example 3. The computer-implemented method of example 1, further comprising determining, by a step selector machine learning model of the content delivery service, a shift step for the time shifting based on the set of embeddings, wherein the time shifting comprises time shifting the proper subset of the plurality of sections of each frame of the plurality of frames by the shift step to generate the time shifted frames.

Example 4. A computer-implemented method comprising:
generating a set of embeddings for each of a plurality of sections of each frame of a plurality of frames of a video;
determining, by one or more machine learning models, a proper subset of the plurality of sections of a frame of the plurality of frames for a time shift based on the set of embeddings;
time shifting the proper subset of the plurality of sections of the frame to generate a time shifted frame;
generating an updated set of embeddings based on the time shifted frame;
receiving a search request comprising input text;
determining the video is a match for the search request based on the input text and the updated set of embeddings for the time shifted frame; and
generating an indication based on the match.

Example 5. The computer-implemented method of example 4, wherein the determining the proper subset of the plurality of sections of the frame comprises determining, by the one or more machine learning models, a ratio of shifted to unshifted sections of the frame based on the set of embeddings.

Example 6. The computer-implemented method of example 5, wherein the determining the proper subset of the plurality of sections of the frame comprises determining one or more sections of the plurality of sections of the frame for a forward time shift based on the ratio.

Example 7. The computer-implemented method of example 6, wherein the determining the proper subset of the plurality of sections of the frame further comprises determining one or more other sections of the plurality of sections of the frame for a backward time shift based on the ratio.

Example 8. The computer-implemented method of example 5, wherein the determining the proper subset of the plurality of sections of the frame comprises determining one or more sections of the plurality of sections of the frame for a backward time shift based on the ratio.

Example 9. The computer-implemented method of example 5, further comprising determining, by the one of more machine learning models, a shift step for the time shifting, wherein the time shifting comprises time shifting the proper subset of the plurality of sections of the frame by the shift step to generate the time shifted frame.

Example 10. The computer-implemented method of example 9, wherein the determining the shift step is for an input of the set of embeddings into the one or more machine learning models.

Example 11. The computer-implemented method of example 4, further comprising determining, by the one of more machine learning models, a shift step for the time shifting, wherein the time shifting comprises time shifting the proper subset of the plurality of sections of the frame by the shift step to generate the time shifted frame.

Example 12. The computer-implemented method of example 4, wherein the time shifting generates a plurality of time shifted frames, and the generating the updated set of embeddings comprises generating a corresponding embedding for each time shifted frame of the plurality of time shifted frames.

Example 13. The computer-implemented method of example 12, further comprising generating an embedding for the input text of the search request, wherein the determining the video is the match comprises comparing the embedding for the input text to the corresponding embeddings for the time shifted frames.

Example 14. The computer-implemented method of example 12, wherein the time shift is used for each time shifted frame of the plurality of time shifted frames.

Example 15. A non-transitory computer-readable medium storing code that, when executed by a device, causes the device to perform a method comprising:
generating a set of embeddings for each of a plurality of sections of each frame of a plurality of frames of a video;
determining, by one or more machine learning models, a proper subset of the plurality of sections of a frame of the plurality of frames for a time shift based on the set of embeddings;
time shifting the proper subset of the plurality of sections of the frame to generate a time shifted frame;
generating an updated set of embeddings based on the time shifted frame;
receiving a search request comprising input text;
determining the video is a match for the search request based on the input text and the updated set of embeddings for the time shifted frame; and
generating an indication based on the match.

Example 16. The non-transitory computer-readable medium of example 15, wherein the determining the proper subset of the plurality of sections of the frame comprises determining, by the one or more machine learning models, a ratio of shifted to unshifted sections of the frame based on the set of embeddings.

Example 17. The non-transitory computer-readable medium of example 16, wherein the method further comprises determining, by the one of more machine learning models, a shift step for the time shifting, wherein the time shifting comprises time shifting the proper subset of the plurality of sections of the frame by the shift step to generate the time shifted frame.

Example 18. The non-transitory computer-readable medium of example 15, wherein the method further comprises determining, by the one of more machine learning models, a shift step for the time shifting, wherein the time shifting comprises time shifting the proper subset of the plurality of sections of the frame by the shift step to generate the time shifted frame.

Example 19. The non-transitory computer-readable medium of example 15, wherein the time shifting generates a plurality of time shifted frames, and the generating the updated set of embeddings comprises generating a corresponding embedding for each time shifted frame of the plurality of time shifted frames.

Example 20. The non-transitory computer-readable medium of example 19, wherein the time shift is used for each time shifted frame of the plurality of time shifted frames.

Figure 8:
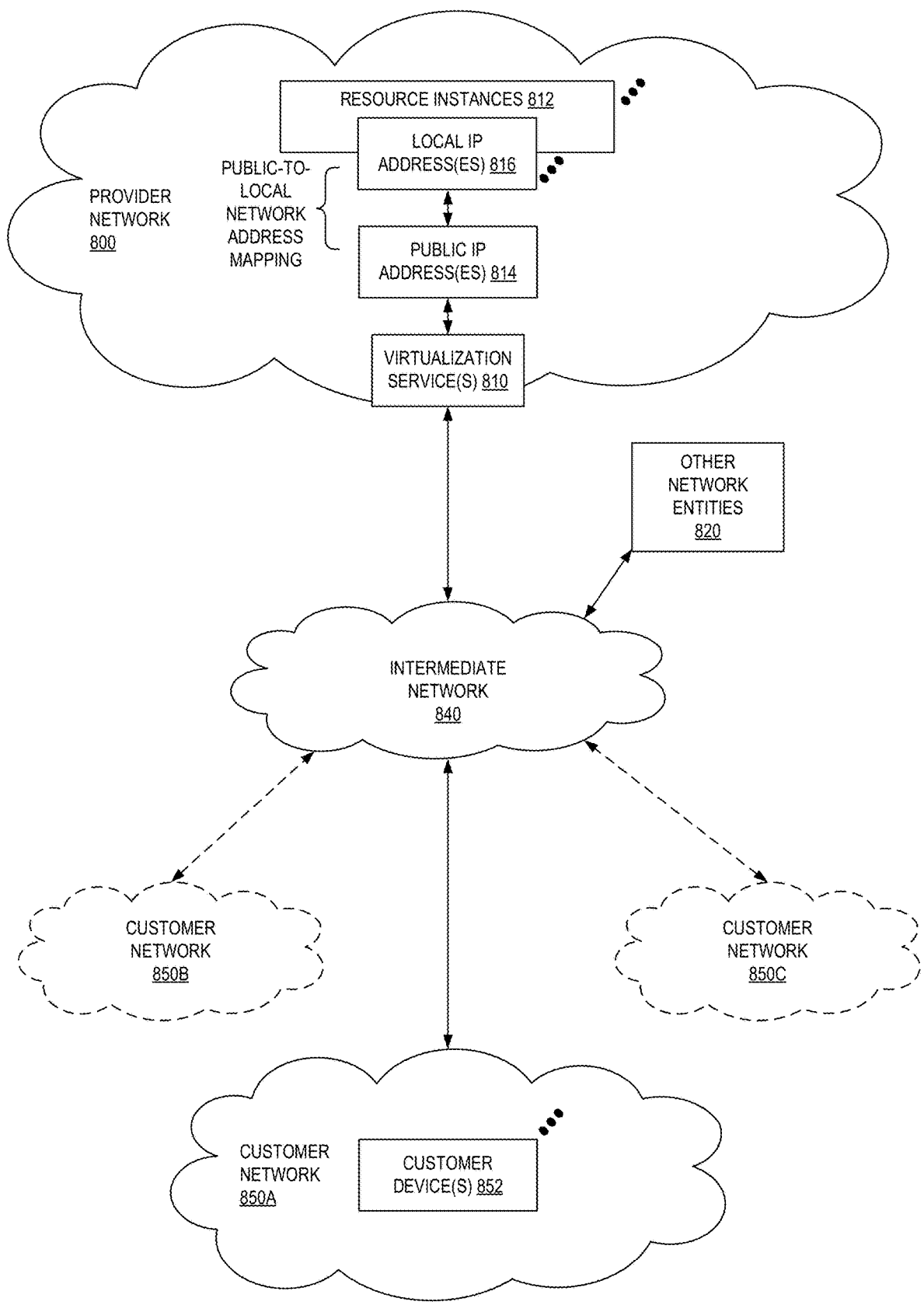
FIG. 8 illustrates an example provider network environment according to some examples.

FIG. 8 illustrates an example provider network (or "service provider system") environment according to some examples. A provider network 800 may provide resource virtualization to customers via one or more virtualization services 810 that allow customers to purchase, rent, or otherwise obtain instances 812 of virtualized resources, including but not limited to computation and storage resources, implemented on devices within the provider network or networks in one or more data centers. Local Internet Protocol (IP) addresses 816 may be associated with the resource instances 812; the local IP addresses are the internal network addresses of the resource instances 812 on the provider network 800. In some examples, the provider network 800 may also provide public IP addresses 814 and/or public IP address ranges (e.g., Internet Protocol version 4 (IPv4) or Internet Protocol version 6 (IPv6) addresses) that customers may obtain from the provider 800.

Conventionally, the provider network 800, via the virtualization services 810, may allow a customer of the service provider (e.g., a customer that operates one or more client networks 850A-850C including one or more customer device(s) 852) to dynamically associate at least some public IP addresses 814 assigned or allocated to the customer with particular resource instances 812 assigned to the customer. The provider network 800 may also allow the customer to remap a public IP address 814, previously mapped to one virtualized computing resource instance 812 allocated to the customer, to another virtualized computing resource instance 812 that is also allocated to the customer. Using the virtualized computing resource instances 812 and public IP addresses 814 provided by the service provider, a customer of the service provider such as the operator of customer network(s) 850A-850C may, for example, implement customer-specific applications and present the customer's applications on an intermediate network 840, such as the Internet. Other network entities 820 on the intermediate network 840 may then generate traffic to a destination public IP address 814 published by the customer network(s) 850A-850C; the traffic is routed to the service provider data center, and at the data center is routed, via a network substrate, to the local IP address 816 of the virtualized computing resource instance 812 currently mapped to the destination public IP address 814. Similarly, response traffic from the virtualized computing resource instance 812 may be routed via the network substrate back onto the intermediate network 840 to the source entity 820.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193, and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some examples, the mapping of a standard IP address to a local IP address of a resource instance is the default launch configuration for all resource instance types.

At least some public IP addresses may be allocated to or obtained by customers of the provider network 800; a customer may then assign their allocated public IP addresses to particular resource instances allocated to the customer. These public IP addresses may be referred to as customer public IP addresses, or simply customer IP addresses. Instead of being assigned by the provider network 800 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 9:
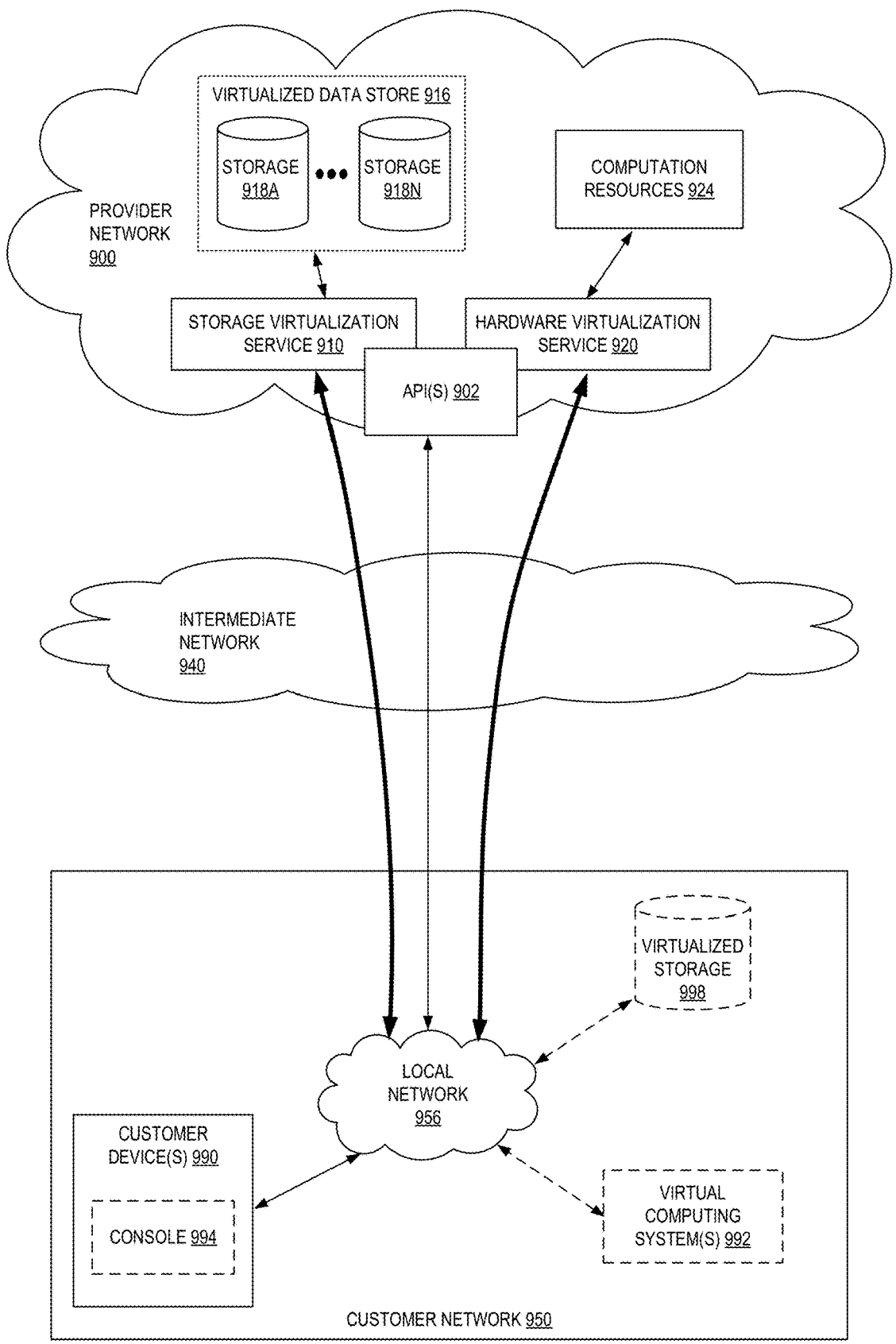
FIG. 9 is a block diagram of an example provider network that provides a storage service and a hardware virtualization service to customers according to some examples.

FIG. 9 is a block diagram of an example provider network that provides a storage service and a hardware virtualization service to customers, according to some examples. Hardware virtualization service 920 provides multiple computation resources 924 (e.g., VMs) to customers. The computation resources 924 may, for example, be rented or leased to customers of the provider network 900 (e.g., to a customer that implements customer network 950). Each computation resource 924 may be provided with one or more local IP addresses. Provider network 900 may be configured to route packets from the local IP addresses of the computation resources 924 to public Internet destinations, and from public Internet sources to the local IP addresses of computation resources 924.

Provider network 900 may provide a customer network 950, for example coupled to intermediate network 940 via local network 956, the ability to implement virtual computing systems 992 via hardware virtualization service 920 coupled to intermediate network 940 and to provider network 900. In some examples, hardware virtualization service 920 may provide one or more APIs 902, for example a web services interface, via which a customer network 950 may access functionality provided by the hardware virtualization service 920, for example via a console 994 (e.g., a web-based application, standalone application, mobile application, etc.). In some examples, at the provider network 900, each virtual computing system 992 at customer network 950 may correspond to a computation resource 924 that is leased, rented, or otherwise provided to customer network 950.

From an instance of a virtual computing system 992 and/or another customer device 990 (e.g., via console 994), the customer may access the functionality of storage service 910, for example via one or more APIs 902, to access data from and store data to storage resources 918A-918N of a virtual data store 916 (e.g., a folder or "bucket", a virtualized volume, a database, etc.) provided by the provider network 900. In some examples, a virtualized data store gateway (not shown) may be provided at the customer network 950 that may locally cache at least some data, for example frequently accessed or critical data, and that may communicate with storage service 910 via one or more communications channels to upload new or modified data from a local cache so that the primary store of data (virtualized data store 916) is maintained. In some examples, a user, via a virtual computing system 992 and/or on another customer device 990, may mount and access virtual data store 916 volumes via storage service 910 acting as a storage virtualization service, and these volumes may appear to the user as local (virtualized) storage 998.

While not shown in FIG. 9, the virtualization service(s) may also be accessed from resource instances within the provider network 900 via API(s) 902. For example, a customer, appliance service provider, or other entity may access a virtualization service from within a respective virtual network on the provider network 900 via an API 902 to request allocation of one or more resource instances within the virtual network or within another virtual network.

Illustrative System

Figure 10:
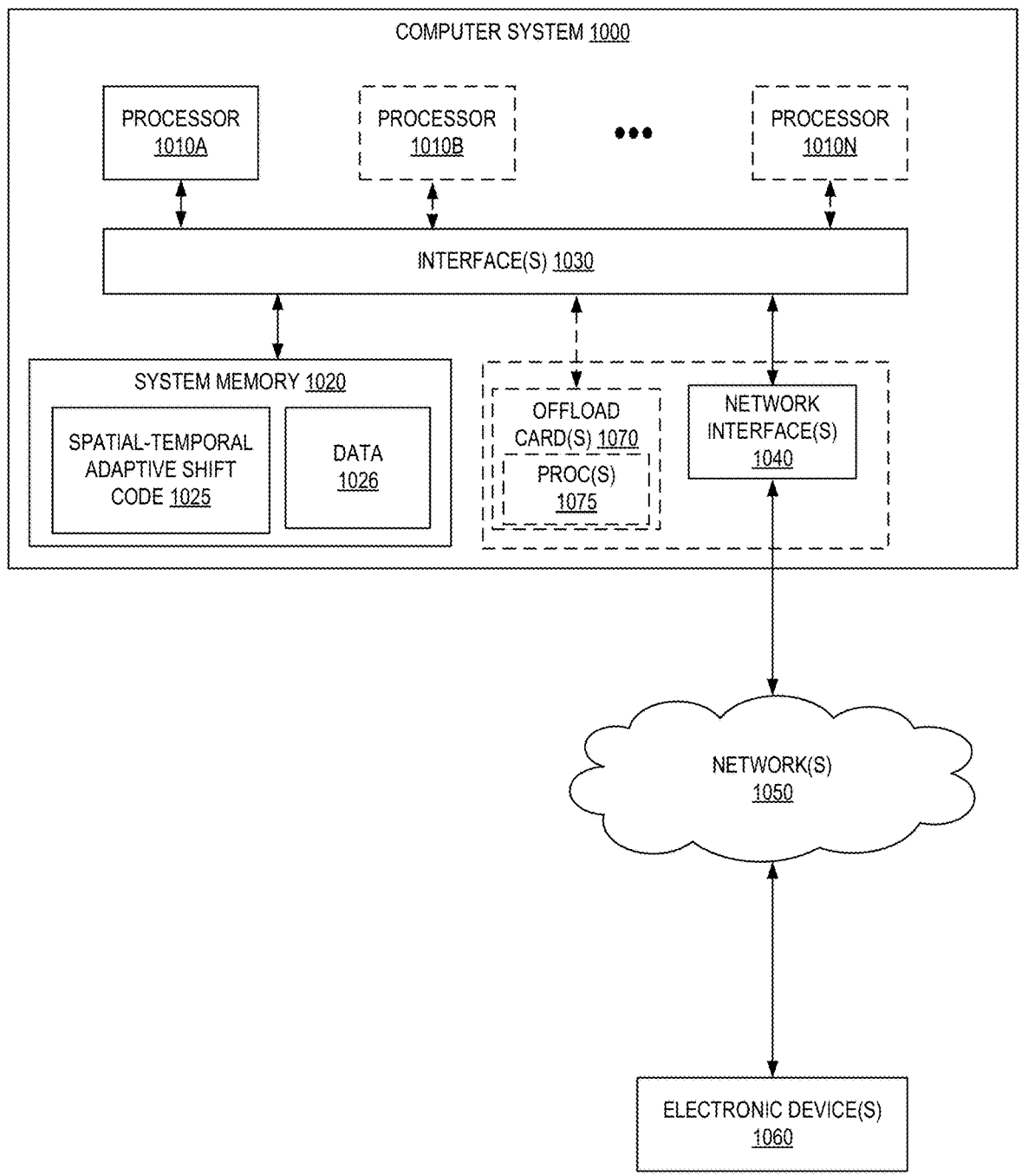
FIG. 10 is a block diagram illustrating an example computer system that may be used in some examples.

In some examples, a system that implements a portion or all of the techniques for content indexing as described herein may include a general-purpose computer system that includes or is configured to access one or more computer-accessible media, such as computer system 1000 illustrated in FIG. 10. In the illustrated example, computer system 1000 includes one or more processors 1010 coupled to a system memory 1020 via an input/output (I/O) interface 1030. Computer system 1000 further includes a network interface 1040 coupled to I/O interface 1030. While FIG. 10 shows computer system 1000 as a single computing device, in various examples a computer system 1000 may include one computing device or any number of computing devices configured to work together as a single computer system 1000.

In various examples, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various examples, processors 1010 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 1010 may commonly, but not necessarily, implement the same ISA.

System memory 1020 may store instructions and data accessible by processor(s) 1010. In various examples, system memory 1020 may be implemented using any suitable memory technology, such as random-access memory (RAM), static RAM (SRAM), synchronous dynamic RAM (SDRAM), nonvolatile/Flash-type memory, or any other type of memory. In the illustrated example, program instructions and data implementing one or more desired functions, such as those methods, techniques, and data described above are shown stored within system memory 1020 as spatial-temporal adaptive shift code 1025 (e.g., executable to implement, in whole or in part, the operations discussed herein) and data 1026.

In one example, I/O interface 1030 may be configured to coordinate I/O traffic between processor 1010, system memory 1020, and any peripheral devices in the device, including network interface 1040 or other peripheral interfaces. In some examples, I/O interface 1030 may perform any necessary protocol, timing, or other data transformations to convert data signals from one component (e.g., system memory 1020) into a format suitable for use by another component (e.g., processor 1010). In some examples, I/O interface 1030 may include support for devices attached through various types of peripheral buses, such as a variant of the Peripheral Component Interconnect (PCI) bus standard or the Universal Serial Bus (USB) standard, for example. In some examples, the function of I/O interface 1030 may be split into two or more separate components, such as a north bridge and a south bridge, for example. Also, in some examples some or all of the functionality of I/O interface 1030, such as an interface to system memory 1020, may be incorporated directly into processor 1010.

Network interface 1040 may be configured to allow data to be exchanged between computer system 1000 and other devices 1060 attached to a network or networks 1050, such as other computer systems or devices as illustrated in FIG. 1, for example. In various examples, network interface 1040 may support communication via any suitable wired or wireless general data networks, such as types of Ethernet network, for example. Additionally, network interface 1040 may support communication via telecommunications/telephony networks such as analog voice networks or digital fiber communications networks, via storage area networks (SANs) such as Fibre Channel SANs, or via I/O any other suitable type of network and/or protocol.

In some examples, a computer system 1000 includes one or more offload cards 1070 (including one or more processors 1075, and possibly including the one or more network interfaces 1040) that are connected using an I/O interface 1030 (e.g., a bus implementing a version of the Peripheral Component Interconnect-Express (PCI-E) standard, or another interconnect such as a QuickPath interconnect (QPI) or UltraPath interconnect (UPI)). For example, in some examples the computer system 1000 may act as a host electronic device (e.g., operating as part of a hardware virtualization service) that hosts compute instances, and the one or more offload cards 1070 execute a virtualization manager that can manage compute instances that execute on the host electronic device. As an example, in some examples the offload card(s) 1070 can perform compute instance management operations such as pausing and/or un-pausing compute instances, launching and/or terminating compute instances, performing memory transfer/copying operations, etc. These management operations may, in some examples, be performed by the offload card(s) 1070 in coordination with a hypervisor (e.g., upon a request from a hypervisor) that is executed by the other processors 1010A-1010N of the computer system 1000. However, in some examples the virtualization manager implemented by the offload card(s) 1070 can accommodate requests from other entities (e.g., from compute instances themselves), and may not coordinate with (or service) any separate hypervisor.

In some examples, system memory 1020 may be one example of a computer-accessible medium configured to store program instructions and data as described above. However, in other examples, program instructions and/or data may be received, sent, or stored upon different types of computer-accessible media. Generally speaking, a computer-accessible medium may include non-transitory storage media or memory media such as magnetic or optical media, e.g., disk or DVD/CD coupled to computer system 1000 via I/O interface 1030. A non-transitory computer-accessible storage medium may also include any volatile or nonvolatile media such as RAM (e.g., SDRAM, double data rate (DDR) SDRAM, SRAM, etc.), read only memory (ROM), etc., that may be included in some examples of computer system 1000 as system memory 1020 or another type of memory. Further, a computer-accessible medium may include transmission media or signals such as electrical, electromagnetic, or digital signals, conveyed via a communication medium such as a network and/or a wireless link, such as may be implemented via network interface 1040.

Figure 11:
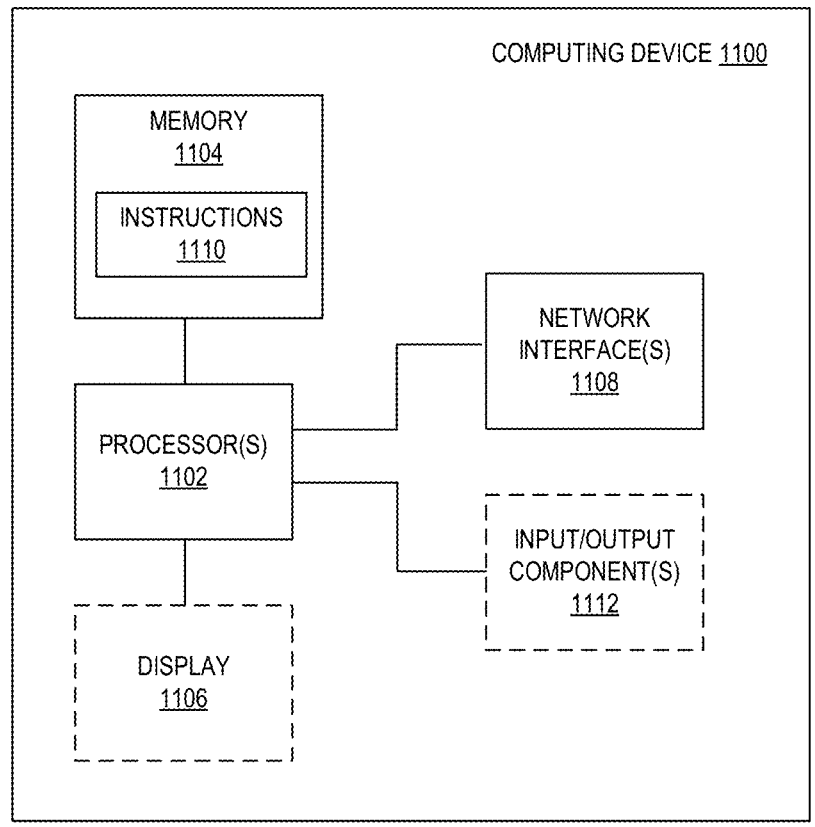
FIG. 11 illustrates a logical arrangement of a set of general components of an exemplary computing device that can be utilized in accordance with various examples.

FIG. 11 illustrates a logical arrangement of a set of general components of an example computing device 1100. Generally, a computing device 1100 can also be referred to as an electronic device. The techniques shown in the figures and described herein can be implemented using code and data stored and executed on one or more electronic devices (e.g., a client end station and/or server end station). Such electronic devices store and communicate (internally and/or with other electronic devices over a network) code and data using computer-readable media, such as non-transitory computer-readable storage media (e.g., magnetic disks, optical disks, Random Access Memory (RAM), Read Only Memory (ROM), flash memory devices, phase-change memory) and transitory computer-readable communication media (e.g., electrical, optical, acoustical or other form of propagated signals, such as carrier waves, infrared signals, digital signals). In addition, such electronic devices include hardware, such as a set of one or more processors 1102 (e.g., wherein a processor is a microprocessor, controller, microcontroller, central processing unit, digital signal processor, application specific integrated circuit, field programmable gate array, other electronic circuitry, a combination of one or more of the preceding) coupled to one or more other components, e.g., one or more non-transitory machine-readable storage media (e.g., memory 1104) to store code (for example, instructions 1110, e.g., which implement a content delivery service as disclosed herein), and a set of one or more wired or wireless network interfaces 1108 allowing the electronic device to transmit data to and receive data from other computing devices, typically across one or more networks (e.g., Local Area Networks (LANs), the Internet). The coupling of the set of processors and other components is typically through one or more interconnects within the electronic device, (e.g., busses and possibly bridges). Thus, the non-transitory machine-readable storage media (e.g., memory 1104) of a given electronic device typically stores code (e.g., instructions 1110) for execution on the set of one or more processors 1102 of that electronic device. One or more parts of various examples may be implemented using different combinations of software, firmware, and/or hardware.

A computing device 1100 can include some type of display element 1106, such as a touch screen or liquid crystal display (LCD), although many devices such as portable media players might convey information via other means, such as through audio speakers, and other types of devices such as server end stations may not have a display element 1106 at all. As discussed, some computing devices used in some examples include at least one input and/or output component(s) 1112 able to receive input from a user. This input component can include, for example, a push button, touch pad, touch screen, wheel, joystick, keyboard, mouse, keypad, or any other such device or element whereby a user is able to input a command to the device. In some examples, however, such a device might be controlled through a combination of visual and/or audio commands and utilize a microphone, camera, sensor, etc., such that a user can control the device without having to be in physical contact with the device.

Figure 12:
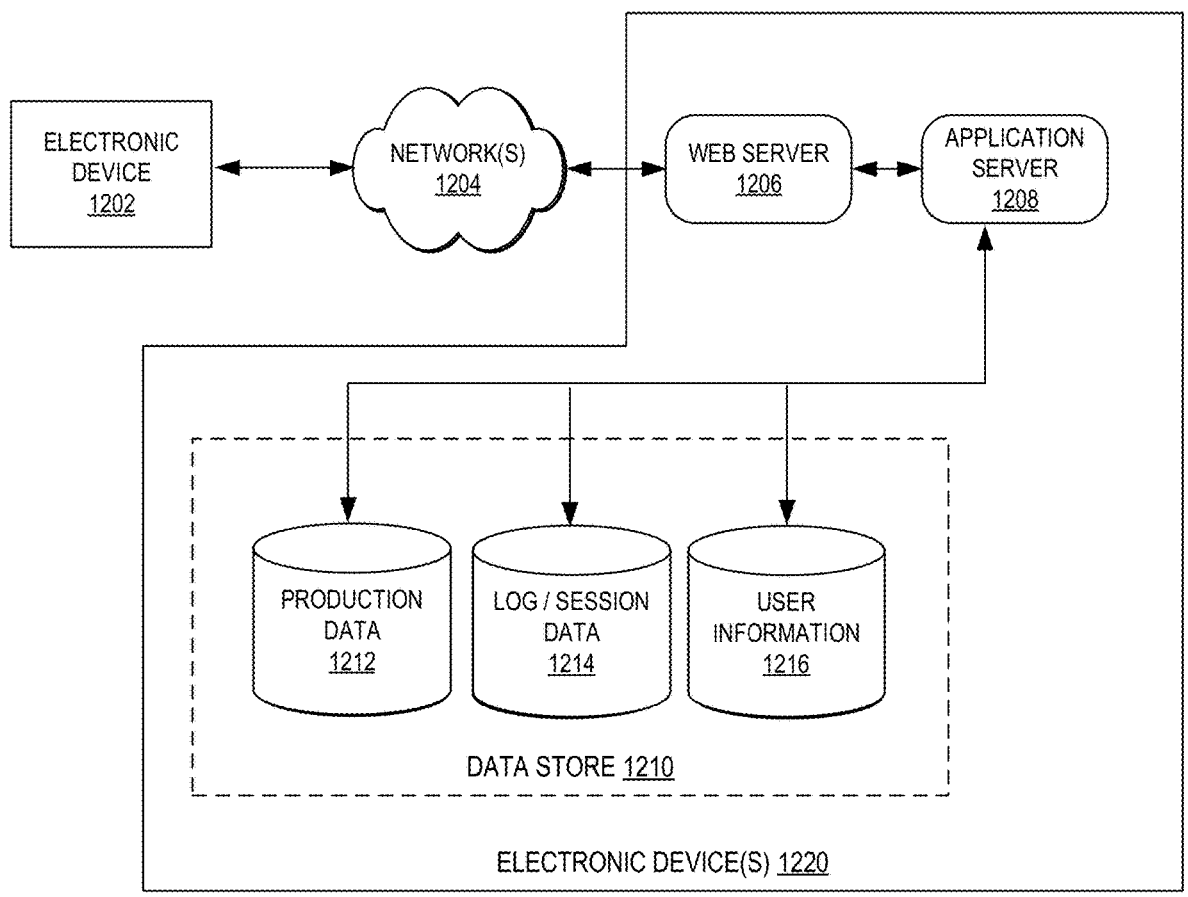
FIG. 12 illustrates an example of an environment for implementing aspects in accordance with various examples.

As discussed, different approaches can be implemented in various environments in accordance with the described examples. For example, FIG. 12 illustrates an example of an environment 1200 for implementing aspects in accordance with various examples. For example, in some examples messages are HyperText Transfer Protocol (HTTP) requests that are received by a web server (e.g., web server 1206), and the users, via electronic devices, may interact with the provider network via a web portal provided via the web server 1206 and application server 1208. As will be appreciated, although a web-based environment is used for purposes of explanation, different environments may be used, as appropriate, to implement various examples. The system includes an electronic client device 1202, which may also be referred to as a client device and can be any appropriate device operable to send and receive requests, messages, or information over an appropriate network 1204 and convey information back to a user of the device 1202. Examples of such client devices include personal computers (PCs), cell phones, handheld messaging devices, laptop computers, set-top boxes, personal data assistants, electronic book readers, wearable electronic devices (e.g., glasses, wristbands, monitors), and the like. The one or more networks 1204 can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network 1204 includes the Internet, as the environment includes a web server 1206 for receiving requests and serving content in response thereto, although for other networks an alternative device serving a similar purpose could be used, as would be apparent to one of ordinary skill in the art.

The illustrative environment includes at least one application server 1208 and a data store 1210. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices and data storage media, in any standard, distributed or clustered environment. The application server 1208 can include any appropriate hardware and software for integrating with the data store 1210 as needed to execute aspects of one or more applications for the client device 1202 and handling a majority of the data access and business logic for an application. The application server 1208 provides access control services in cooperation with the data store 1210 and is able to generate content such as text, graphics, audio, video, etc., to be transferred to the client device 1202, which may be served to the user by the web server in the form of HyperText Markup Language (HTML), Extensible Markup Language (XML), JavaScript Object Notation (JSON), or another appropriate unstructured or structured language in this example. The handling of all requests and responses, as well as the delivery of content between the client device 1202 and the application server 1208, can be handled by the web server 1206. It should be understood that the web server 1206 and application server 1208 are not required and are merely example components, as structured code discussed herein can be executed on any appropriate device or host machine as discussed elsewhere herein.

The data store 1210 can include several separate data tables, databases, or other data storage mechanisms and media for storing data relating to a particular aspect. For example, the data store illustrated includes mechanisms for storing production data 1212 and user information 1216, which can be used to serve content for the production side. The data store 1210 also is shown to include a mechanism for storing log or session data 1214. It should be understood that there can be many other aspects that may need to be stored in the data store, such as page image information and access rights information, which can be stored in any of the above listed mechanisms as appropriate or in additional mechanisms in the data store 1210. The data store 1210 is operable, through logic associated therewith, to receive instructions from the application server 1208 and obtain, update, or otherwise process data in response thereto. In one example, a user might submit a search request for a certain type of item. In this case, the data store 1210 might access the user information 1216 to verify the identity of the user and can access a production data 1212 to obtain information about items of that type. The information can then be returned to the user, such as in a listing of results on a web page that the user is able to view via a browser on the user device 1202. Information for a particular item of interest can be viewed in a dedicated page or window of the browser.

The web server 1206, application server 1208, and/or data store 1210 may be implemented by one or more electronic devices 1220, which can also be referred to as electronic server devices or server end stations, and may or may not be located in different geographic locations. Each of the one or more electronic devices 1220 may include an operating system that provides executable program instructions for the general administration and operation of that device and typically will include computer-readable medium storing instructions that, when executed by a processor of the device, allow the device to perform its intended functions. Suitable implementations for the operating system and general functionality of the devices are known or commercially available and are readily implemented by persons having ordinary skill in the art, particularly in light of the disclosure herein.

The environment in one example is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 12. Thus, the depiction of the environment 1200 in FIG. 12 should be taken as being illustrative in nature and not limiting to the scope of the disclosure.

Various examples discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most examples utilize at least one network that would be familiar to those skilled in the art for supporting communications using any of a variety of commercially available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In examples utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

The environment can include a variety of data stores and other memory and storage media as discussed above. These can reside in a variety of locations, such as on a storage medium local to (and/or resident in) one or more of the computers or remote from any or all of the computers across the network. In a particular set of examples, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, services, or other elements located within at least one working memory device, including an operating system and application programs, such as a client application or web browser. It should be appreciated that alternate examples may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program code, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various examples.

In the preceding description, various examples are described. For purposes of explanation, specific configurations and details are set forth in order to provide a thorough understanding of the examples. However, it will also be apparent to one skilled in the art that the examples may be practiced without the specific details. Furthermore, well-known features may be omitted or simplified in order not to obscure the example being described.

Bracketed text and blocks with dashed borders (e.g., large dashes, small dashes, dot-dash, and dots) are used herein to illustrate optional operations that add additional features to some examples. However, such notation should not be taken to mean that these are the only options or optional operations, and/or that blocks with solid borders are not optional in certain examples.

Reference numerals with suffix letters (e.g., 918A-918N) may be used to indicate that there can be one or multiple instances of the referenced entity in various examples, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various examples.

References to "one example," "an example," etc., indicate that the example described may include a particular feature, structure, or characteristic, but every example may not necessarily include the particular feature, structure, or characteristic. Moreover, such phrases are not necessarily referring to the same example. Further, when a particular feature, structure, or characteristic is described in connection with an example, it is submitted that it is within the knowledge of one skilled in the art to affect such feature, structure, or characteristic in connection with other examples whether or not explicitly described.

Moreover, in the various examples described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given example requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
   receiving a video comprising a plurality of frames at a content delivery service;
   generating, by the content delivery service, a set of embeddings for each of a plurality of sections of each frame of the plurality of frames;
   determining, by a candidate selector machine learning model of the content delivery service, a proper subset of the plurality of sections of each frame of the plurality of frames for a time shift based on the set of embeddings;
   time shifting, by the content delivery service, the proper subset of the plurality of sections of each frame of the plurality of frames to generate time shifted frames;
   generating, by the content delivery service, an updated set of embeddings based on the time shifted frames;
   receiving a search request comprising input text from a user device;
   determining the video is a match for the search request based on the input text and the updated set of embeddings for the time shifted frames; and
   sending the video to the user device based on the match.

2. The computer-implemented method of claim 1, wherein the determining the proper subset of the plurality of sections of each frame comprises determining, by the candidate selector machine learning model of the content delivery service, a ratio of shifted to unshifted sections of the plurality of frames based on the set of embeddings.

3. The computer-implemented method of claim 1, further comprising determining, by a step selector machine learning model of the content delivery service, a shift step for the time shifting based on the set of embeddings, wherein the time shifting comprises time shifting the proper subset of the plurality of sections of each frame of the plurality of frames by the shift step to generate the time shifted frames.

4. A computer-implemented method comprising:
   generating a set of embeddings for each of a plurality of sections of each frame of a plurality of frames of a video;
   determining, by one or more machine learning models, a proper subset of the plurality of sections of a frame of the plurality of frames for a time shift based on the set of embeddings;
   time shifting the proper subset of the plurality of sections of the frame to generate a time shifted frame;
   generating an updated set of embeddings based on the time shifted frame;
   receiving a search request comprising input text;

determining the video is a match for the search request based on the input text and the updated set of embeddings for the time shifted frame; and generating an indication based on the match.

5. The computer-implemented method of claim 4, wherein the determining the proper subset of the plurality of sections of the frame comprises determining, by the one or more machine learning models, a ratio of shifted to unshifted sections of the frame based on the set of embeddings.

6. The computer-implemented method of claim 5, wherein the determining the proper subset of the plurality of sections of the frame comprises determining one or more sections of the plurality of sections of the frame for a forward time shift based on the ratio.

7. The computer-implemented method of claim 6, wherein the determining the proper subset of the plurality of sections of the frame further comprises determining one or more other sections of the plurality of sections of the frame for a backward time shift based on the ratio.

8. The computer-implemented method of claim 5, wherein the determining the proper subset of the plurality of sections of the frame comprises determining one or more sections of the plurality of sections of the frame for a backward time shift based on the ratio.

9. The computer-implemented method of claim 5, further comprising determining, by the one of more machine learning models, a shift step for the time shifting, wherein the time shifting comprises time shifting the proper subset of the plurality of sections of the frame by the shift step to generate the time shifted frame.

10. The computer-implemented method of claim 9, wherein the determining the shift step is for an input of the set of embeddings into the one or more machine learning models.

11. The computer-implemented method of claim 4, further comprising determining, by the one of more machine learning models, a shift step for the time shifting, wherein the time shifting comprises time shifting the proper subset of the plurality of sections of the frame by the shift step to generate the time shifted frame.

12. The computer-implemented method of claim 4, wherein the time shifting generates a plurality of time shifted frames, and the generating the updated set of embeddings comprises generating a corresponding embedding for each time shifted frame of the plurality of time shifted frames.

13. The computer-implemented method of claim 12, further comprising generating an embedding for the input text of the search request, wherein the determining the video is the match comprises comparing the embedding for the input text to the corresponding embeddings for the time shifted frames.

14. The computer-implemented method of claim 12, wherein the time shift is used for each time shifted frame of the plurality of time shifted frames.

15. A non-transitory computer-readable medium storing code that, when executed by a device, causes the device to perform a method comprising:

generating a set of embeddings for each of a plurality of sections of each frame of a plurality of frames of a video;

determining, by one or more machine learning models, a proper subset of the plurality of sections of a frame of the plurality of frames for a time shift based on the set of embeddings;

time shifting the proper subset of the plurality of sections of the frame to generate a time shifted frame;

generating an updated set of embeddings based on the time shifted frame;

receiving a search request comprising input text;

determining the video is a match for the search request based on the input text and the updated set of embeddings for the time shifted frame; and generating an indication based on the match.

16. The non-transitory computer-readable medium of claim 15, wherein the determining the proper subset of the plurality of sections of the frame comprises determining, by the one or more machine learning models, a ratio of shifted to unshifted sections of the frame based on the set of embeddings.

17. The non-transitory computer-readable medium of claim 16, wherein the method further comprises determining, by the one of more machine learning models, a shift step for the time shifting, wherein the time shifting comprises time shifting the proper subset of the plurality of sections of the frame by the shift step to generate the time shifted frame.

18. The non-transitory computer-readable medium of claim 15, wherein the method further comprises determining, by the one of more machine learning models, a shift step for the time shifting, wherein the time shifting comprises time shifting the proper subset of the plurality of sections of the frame by the shift step to generate the time shifted frame.

19. The non-transitory computer-readable medium of claim 15, wherein the time shifting generates a plurality of time shifted frames, and the generating the updated set of embeddings comprises generating a corresponding embedding for each time shifted frame of the plurality of time shifted frames.

20. The non-transitory computer-readable medium of claim 19, wherein the time shift is used for each time shifted frame of the plurality of time shifted frames.

* * * * *